(12) United States Patent
Adachi et al.

(10) Patent No.: US 7,226,097 B2
(45) Date of Patent: Jun. 5, 2007

(54) BUMPER ABSORBER FOR PEDESTRAIN PROTECTION

(75) Inventors: Junji Adachi, Ichinomiya (JP); Naruaki Abe, Toyota (JP); Fumihiko Sato, Nagoya (JP); Taku Fukuyama, Ikoma (JP); Kouji Mori, Nara (JP); Yoshikatsu Miwa, Nagoya (JP); Yukiya Morita, Suita (JP)

(73) Assignees: Sekisui Kaseihin Kogyo Kabushiki Kaisha, Osaka (JP); Kabushiki Kaisha Chugai, Aichi (JP)

( * ) Notice: Subject to any disclaimer, the term of this patent is extended or adjusted under 35 U.S.C. 154(b) by 0 days.

(21) Appl. No.: 10/529,739

(22) PCT Filed: Sep. 30, 2003

(86) PCT No.: PCT/JP03/12496

§ 371 (c)(1),
(2), (4) Date: Oct. 17, 2005

(87) PCT Pub. No.: WO2004/028863

PCT Pub. Date: Apr. 8, 2004

(65) Prior Publication Data

US 2006/0131899 A1 Jun. 22, 2006

(30) Foreign Application Priority Data

Sep. 30, 2002 (JP) .............................. 2002-285571
Mar. 27, 2003 (JP) .............................. 2002-086965
Mar. 27, 2003 (JP) .............................. 2003-086964

(51) Int. Cl.
B60R 19/03 (2006.01)

(52) U.S. Cl. ...................... 293/120; 293/117; 293/122

(58) Field of Classification Search ................ 293/120, 293/109, 121, 122, 142
See application file for complete search history.

(56) References Cited

U.S. PATENT DOCUMENTS 4,328,986 A * 5/1982 Weller et al. ................ 293/120

(Continued)

FOREIGN PATENT DOCUMENTS

JP 57-37051 2/1982

(Continued)

*Primary Examiner*—Kiran B. Patel
(74) *Attorney, Agent, or Firm*—Knobbe Martens Olson & Bear LLP

(57) ABSTRACT

A bumper absorber for protecting pedestrians (20) is formed into a W-shaped cross-sectional configuration, as taken along a direction which is orthogonal to a longitudinal direction of the bumper absorber. The W-shaped cross sectional configuration has portions in which a front notch portion (22), an upper rear notch portion (24), and a lower rear notch portion (26) overlap with one another in a vertical direction of a vehicle. Ribs (30) are formed respectively at the upper rear notch portion (24) and the lower rear notch portion (26), and a triangular notch (32) is formed from a vehicle rear side at each of the rib (30). Further, the ribs 30 are formed at the upper rear notch portion (24) and the lower rear notch portion (26) so as to be separated from each other at predetermined intervals in a longitudinal direction of the bumper absorber, namely, in a transverse direction of the vehicle. With this structure, a rise in impact load acting on a pedestrian who is hit by a bumper can be controlled.

13 Claims, 28 Drawing Sheets

U.S. PATENT DOCUMENTS

| | | | |
|---|---|---|---|
| 4,413,856 A * | 11/1983 | McMahan et al. | 293/120 |
| 4,762,352 A * | 8/1988 | Enomoto | 293/120 |
| 4,996,634 A * | 2/1991 | Haneda et al. | 293/117 |
| 5,080,411 A * | 1/1992 | Stewart et al. | 293/122 |
| 5,201,912 A * | 4/1993 | Terada et al. | 293/120 |
| 2004/0017089 A1* | 1/2004 | Hunter et al. | 293/120 |
| 2004/0056491 A1* | 3/2004 | Murata et al. | 293/120 |
| 2005/0269805 A1* | 12/2005 | Kalliske et al. | 280/730.1 |
| 2006/0145490 A1* | 7/2006 | Yamaguchi et al. | 293/109 |
| 2006/0185922 A1* | 8/2006 | Tanabe | 180/274 |

FOREIGN PATENT DOCUMENTS

| | | |
|---|---|---|
| JP | 57-047234 | 3/1982 |
| JP | 60-37457 | 3/1985 |
| JP | 11-11239 | 1/1999 |
| JP | 11-129840 | 5/1999 |
| JP | 11-348699 | 12/1999 |
| JP | 2002-205613 | 7/2002 |

* cited by examiner

F I G. 15
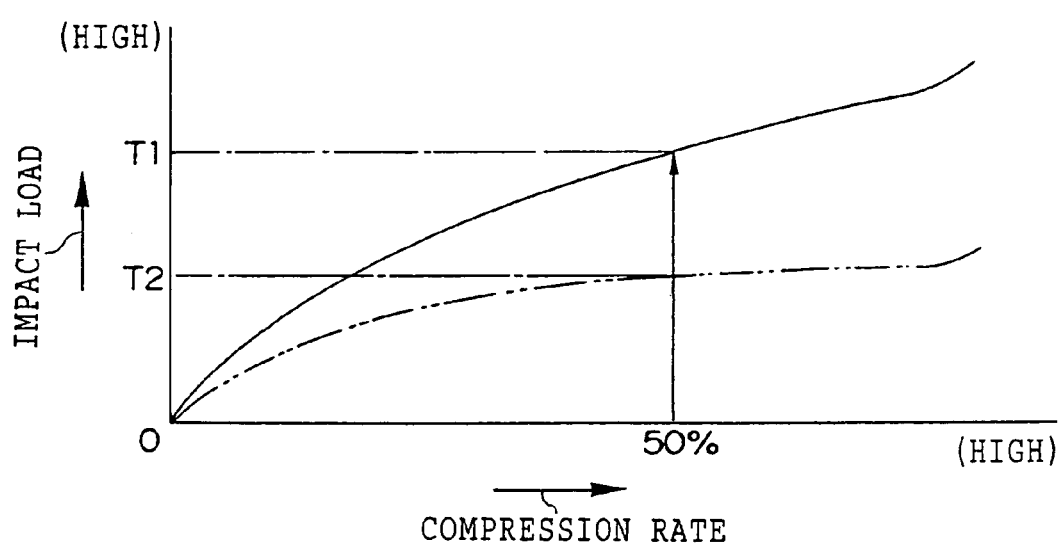

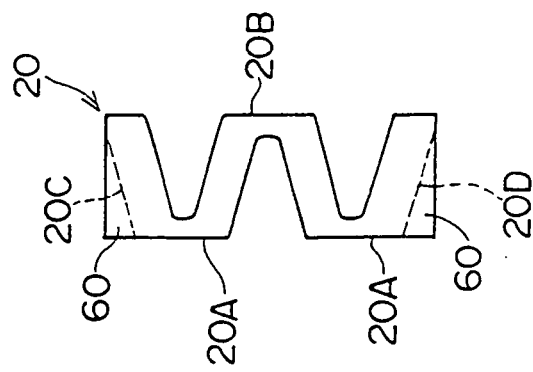
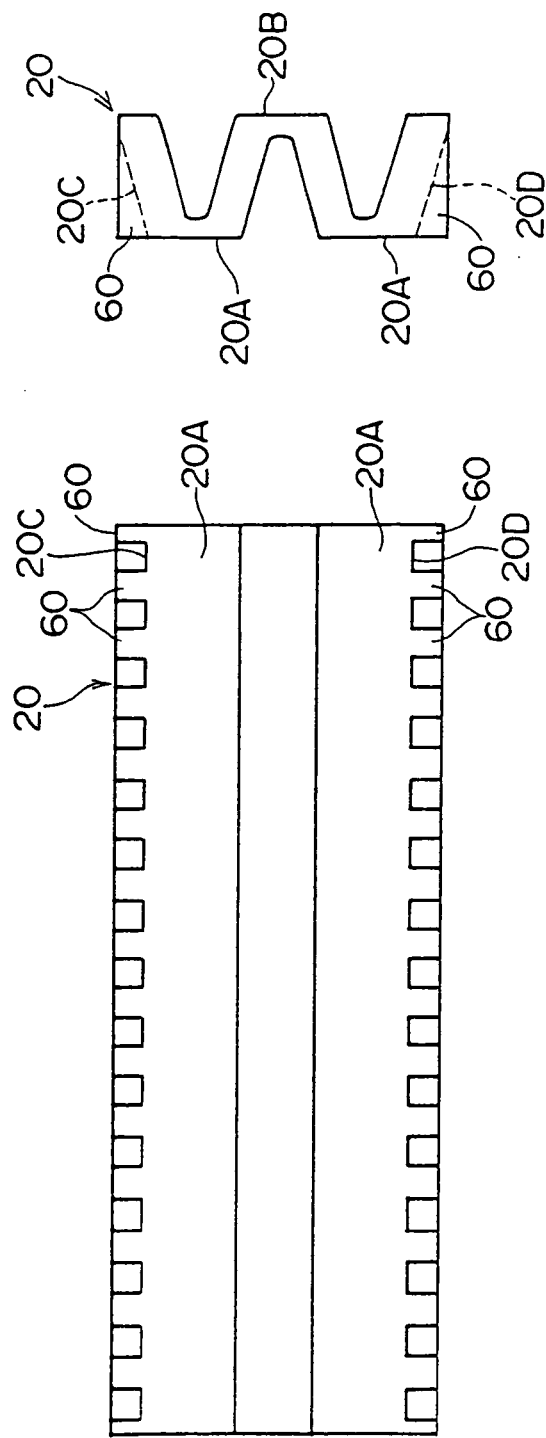
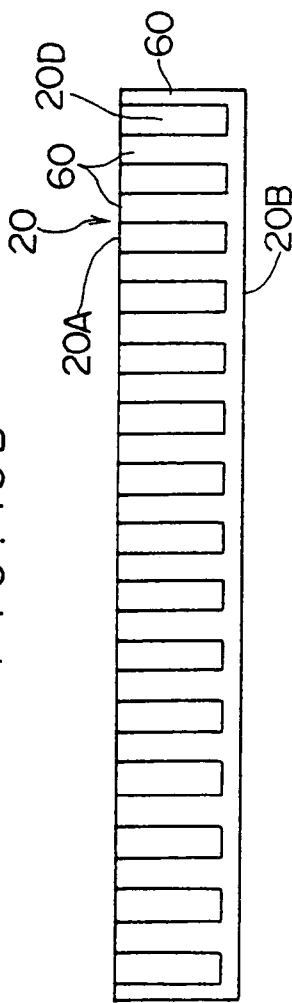

BUMPER ABSORBER FOR PEDESTRAIN PROTECTION

BACKGROUND OF THE INVENTION

1. Field of the Invention

The present invention relates to a bumper absorber for protecting pedestrians, and more particularly, to a bumper absorber for protecting pedestrians at the time of collision when a pedestrian is hit by a vehicle such as an automobile.

2. Background Art

Conventionally, it has been known that a bumper absorber for a vehicle such as an automobile is structured such that an energy absorber made of a foam is formed into a substantially I-shaped cross-sectional configuration, which aims both to protect pedestrians and to realize a level of performance which is traditionally demanded of a bumper (for example, Japanese Patent Application Laid-Open No. 60-37457).

However, with the aforementioned bumper absorber, when a load is applied from a vehicle front to the bumper absorber at a time of collision, an upper wall portion and a lower wall portion of the energy absorber having a substantially I-shaped cross-sectional configuration are compressed and deformed into a vehicle longitudinal direction. As a result, a rise in the initial load level is subdued, and the amount of energy absorbed decreases.

Therefore, a bumper absorber for protecting pedestrians is desirable in which a load level rises immediately at an initial stage when a load is applied to the bumper absorber, that is, when a pedestrian is hit by a bumper.

In another type of conventional bumper absorber, as shown in FIG. 28, a bumper absorber (also referred to as an "energy absorber") 104 is housed in a bumper cover 102 (also referred to as a "shell") of a bumper 100. The bumper absorber 104, as seen from a direction which is orthogonal to a longitudinal direction of the bumper absorber 104, is formed into a lopsided U-shaped cross-sectional configuration in which an opening portion 106 is formed to face a vehicle front. The bumper absorber 104 is also provided with a vehicle rear portion 104A in which a plurality of convex portions 108 is formed to face a vehicle rear and the vehicle rear portion 104A is fixed to a bumper reinforcement (also referred to as a "mounting means") 110 (for example, JP-A No. 57-47234).

However, with the aforementioned bumper absorber 104, when, at the time of a collision, a load is applied from the vehicle front to the bumper absorber 104, as shown by a chain double-dashed line in FIG. 28, an upper wall portion 104B and a lower wall portion 104C of the bumper absorber 104 are compressed and deformed in a vehicle longitudinal direction. As a result, in direct relation to the rate of compression at which the bumper absorber 104 is compressed, there is a proportionate rise in impact load applied by the bumper absorber 104 on a pedestrian hit by the bumper.

In view of the aforementioned facts, an object of the present invention is to provide a bumper absorber for protecting pedestrians in which a load level can be swiftly raised at an initial stage when a load is applied to the bumper absorber, that is, when a pedestrian is hit by a bumper and in which a rise in an impact load acting on a pedestrian who is hit by the bumper can also be controlled.

SUMMARY OF THE INVENTION

In order to solve the above-described problems, the present invention of claim 1 relates to a bumper absorber for protecting pedestrians, which is disposed in a bumper cover with a longitudinal direction of the bumper absorber for protecting pedestrians disposed along a vehicle transverse direction and which is formed by a foam for absorbing impact energy, characterized in that a cross-sectional configuration which is orthogonal to the longitudinal direction of the bumper absorber for protecting pedestrians is formed into a shape having a portion in which a front notch portion notched from a vehicle front side and rear notch portions notched from a vehicle rear side overlap with one another in a vehicle vertical direction, and the bumper absorber for protecting pedestrians has opening means for opening, when a load having a predetermined value or higher is applied from the vehicle front to the bumper absorber for protecting pedestrians, an upper wall portion in an upper direction and for opening a lower wall portion in a lower direction.

Therefore, when, at the time of a collision, a load having a predetermined value or higher is applied from the vehicle front to the bumper absorber, with an operation of the opening means, the front notch portion and the rear notch portions are opened, and the upper wall portion and the lower wall portion of the bumper absorber extend in the vehicle vertical direction upward and downwards, respectively. Accordingly, the upper wall portion and the lower wall portion of the bumper absorber are not compressed and deformed in the vehicle longitudinal (front-rear) direction. As a result, a rise in an impact load applied by the bumper absorber on a body into which the vehicle collides (i.e., a pedestrian who is hit by a bumper) can be controlled.

The present invention of claim 2 is a bumper absorber for protecting pedestrians, which is disposed in a bumper cover with a longitudinal direction of the bumper absorber for protecting pedestrians disposed along a vehicle transverse direction and which is formed by a foam for absorbing impact energy, characterized in that a cross-sectional configuration which is orthogonal to the longitudinal direction of the bumper absorber for protecting pedestrians is formed into a W shape having a portion in which a front notch portion notched from a vehicle front side and rear notch portions notched from a vehicle rear side overlap with one another in a vehicle vertical direction.

Therefore, when, at the time of the collision, a load having a predetermined value or higher is applied from the vehicle front, the front notch portion and the rear notch portions of the bumper absorber whose cross-sectional configuration which is orthogonal to the longitudinal direction of the bumper absorber is formed into a W shape, are opened, and the upper wall portion and the lower wall portion of the bumper absorber extend in the vehicle vertical direction. Accordingly, the upper wall portion and the lower wall portion of the bumper absorber are not compressed and deformed in the vehicle longitudinal direction. As a result, a rise in an impact load applied by the bumper absorber on a body into which the vehicle collides (i.e., a pedestrian who is hit by a bumper) can be controlled.

The present invention of claim 3 is the bumper absorber according to claim 1 or 2, further comprising opening controlling means for controlling opening of the upper wall portion and the lower wall portion at an initial stage when a load is applied from the vehicle front to the bumper absorber.

Accordingly, in addition to one of the claims 1 and 2, at an initial stage when a load is applied from the vehicle front to the bumper absorber, with an operation of the opening controlling means, opening of the upper wall portion and the lower wall portion can be suppressively controlled. Consequently, an initial rise in load level applied from the vehicle front to the bumper absorber can be made higher than in a case in which opening controlling means is not formed.

The present invention of claim 4 is the bumper absorber according to claim 3, wherein the opening controlling means are at least ribs that are formed so as to be separated from each other at predetermined intervals in a longitudinal direction of the notches at the vehicle rear side, and the ribs are broken when the upper wall portion and the lower wall portion are bent and deformed to a predetermined amount.

Therefore, at an initial stage when a load is applied from the vehicle front to the bumper absorber, with an operation of at least the ribs which are formed so as to be separated from one another in a longitudinal direction of the notches at the vehicle rear side, opening of the upper wall portion and the lower wall portion can be suppressively controlled. Thereafter, when the upper wall portion and the lower wall portion are bent and deformed to a predetermined amount, the ribs are broken. Consequently, an initial rise in load level applied from the vehicle front to the bumper absorber can be made higher than in a case in which the ribs are not formed.

The present invention of claim 5 is the bumper absorber according to claim 3, wherein the opening controlling means is a fixing means for fixing the upper wall portion and the lower wall portion to a bumper reinforcement, and fixing by the fixing means is released when the upper wall portion and the lower wall portion are bent and deformed to a predetermined amount.

Therefore, at an initial stage when a load is applied from the vehicle front to the bumper absorber, with an operation of the fixing means for fixing the upper wall portion and the lower wall portion to the bumper reinforcement, opening of the upper wall portion and the lower wall portion can be suppressively controlled and thereafter, fixing is released when the upper wall portion and the lower wall portion are bent and deformed to a predetermined amount. Consequently, an initial rise in load level applied from the vehicle front to the bumper absorber can be made higher than in a case in which a fixing means is not provided.

The present invention of claim 6 is the bumper absorber according to any one of claims 1 to 5, further comprising a groove which is formed from a side opposite to the front notch.

Therefore, since, at an initial stage of the deformation of the bumper absorber, a bending load is easily generated at a portion opposite to the front notch portion starting from the groove, an initial rise in a load level can be increased. Further, in the final stages of the deformation of the bumper absorber, due to an extension of the portion at which the groove is formed, a remaining thickness of the bumper absorber which has been compressed is reduced, and in consequence, the timing at which a bottoming load is generated can be delayed.

The present invention of claim 7 is the bumper absorber according to any one of claims 1 to 6, wherein a cutting edge angle of the front notch portion and those of each of the rear notch portions are from 10° to 15°.

Since a cutting edge angle of the front notch portion and those of each of the rear notch portions are from 10° to 15°, an initial rise in a load level can be made higher and the timing at which a bottoming load is generated can be delayed.

The present invention of claim 8 is the bumper absorber according to any one of claims 1 to 7, further comprising convex portions which are formed at an inside of each of the rear notch portions and which are pressed and broken by the bumper reinforcement when a load having a predetermined value or higher is applied from the vehicle front to the bumper absorber.

Since the convex portions which are formed at an inside of each of the rear notch portions are pressed by the bumper reinforcement, the initial rise in load level can be increased. Further, in the final stages of the deformation of the bumper absorber, when the convex portions formed at the inside of each of the rear notch portions are pressed and broken by the bumper reinforcement, the rear notch portions extend, and remaining thickness of the bumper absorber which has been compressed is reduced, whereby the timing at which a bottoming load is generated can be delayed.

The present invention of claim 9 is the bumper absorber according to claim 4, wherein a width of each of the ribs is from 5 mm to 10 mm and intervals between the ribs are from 30 mm to 50 mm.

Since a width of each of the ribs is from 5 mm to 10 mm and intervals between the ribs are from 30 mm to 50 mm, energy absorbing performance can be improved.

The present invention of claim 10 is the bumper absorber according to claim 2, wherein orientations of W shapes in a front-rear direction of the bumper absorber are inverted at predetermined intervals in the vehicle transverse direction.

Accordingly, at an initial stage when a load is applied to the bumper absorber for protecting pedestrians, the load is applied to the bumper absorber in a direction in which some W shapes extend and the rest of the W shapes contract. Consequently, at a connecting portion on a boundary portion between the adjacent inverted W shapes, a shearing force is generated. For this reason, an initial rise in load level can be increased.

The present invention of claim 11 is the bumper absorber according to claim 10, wherein a boundary surface of an inverted W shape is inclined in a direction in which the inverted W shape is removed from a mold.

That is, in addition to claim 10, the boundary surface of the inverted W shape is inclined in a direction in which the inverted W shape is removed from a mold, and thus removal of the absorber from the mold is facilitated. As a result, the bumper absorber can be manufactured with a simple mold structure in which ordinary upper and lower molds are used and use of a slide cam is not required.

The present invention of claim 12 is a bumper absorber for protecting pedestrians, which is disposed in a bumper cover with a longitudinal direction of the bumper absorber for protecting pedestrians disposed along a vehicle transverse direction and which is formed by a foam for absorbing impact energy, characterized in that a cross-sectional configuration which is orthogonal to the longitudinal direction of the bumper absorber for protecting pedestrians is formed into a zigzag shape having a portion in which a front notch portion notched from a vehicle front side and rear notch portions notched from a vehicle rear side overlap with one another in a vehicle vertical direction, and orientations of zigzag shapes in a longitudinal direction are inverted at predetermined intervals in the vehicle transverse direction.

Thus, at an initial stage when a load is applied to the bumper absorber for protecting pedestrians, the load is applied to the bumper absorber in a direction in which some zigzag shapes extend, and the rest of the zigzag shapes contract. Consequently, a shearing force is generated at a connecting portion of a boundary portion between the adjacent inverted zigzag shapes, and for this reason, an initial rise in load level can be made higher.

BRIEF DESCRIPTION OF THE DRAWINGS

FIG. 15 is a graph of load characteristics of the bumper absorber for protecting pedestrians according to the sixth embodiment of the present invention;

FIG. 19A is a plan view of a bumper absorber for protecting pedestrians according to a tenth embodiment of the present invention, FIG. 19B is a front view of the bumper absorber for protecting pedestrians of FIG. 19A, and FIG. 19C is a side view of the bumper absorber for protecting pedestrians of FIG. 19A;

EMBODIMENT

[First Embodiment]

With reference to FIGS. 1 to 5, a bumper absorber for protecting pedestrians according to a first embodiment of the present invention will be explained hereinafter.

In these figures, arrow "UP" indicates an upper direction of a vehicle (hereinafter, "vehicle upper direction"), and arrow FR indicates a front direction of the vehicle (hereinafter, "vehicle front direction").

Figure 3:
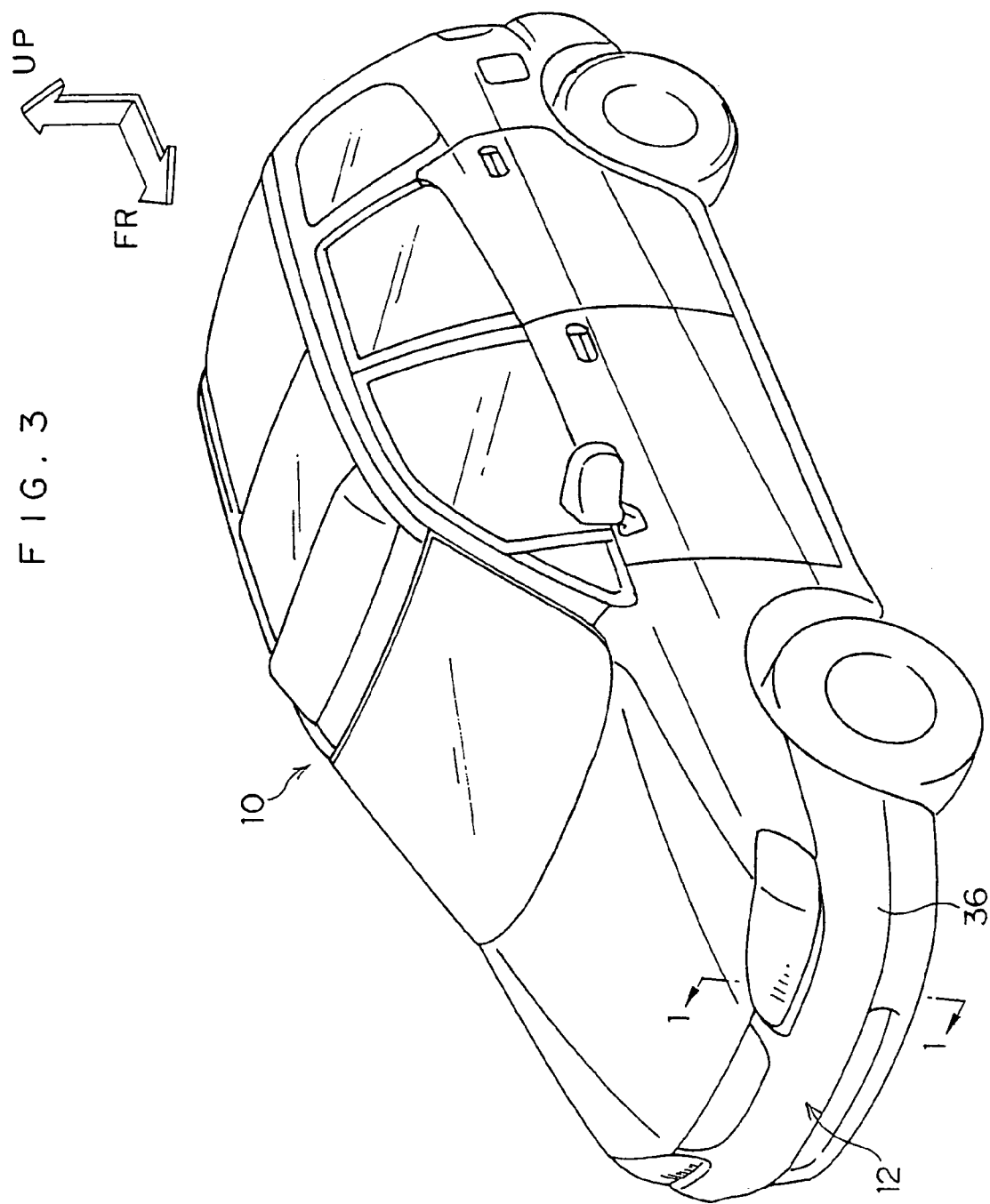
FIG. 3 is a perspective view of a vehicle body seen from a vehicle diagonal front, in which vehicle the bumper absorber for protecting pedestrians according to the first embodiment of the present invention is adopted.

As shown in FIG. 3, in the present embodiment, a front bumper 12 is disposed at a lower front end portion of a vehicle body 10 of an automobile in a vehicle transverse direction.

Figure 1:
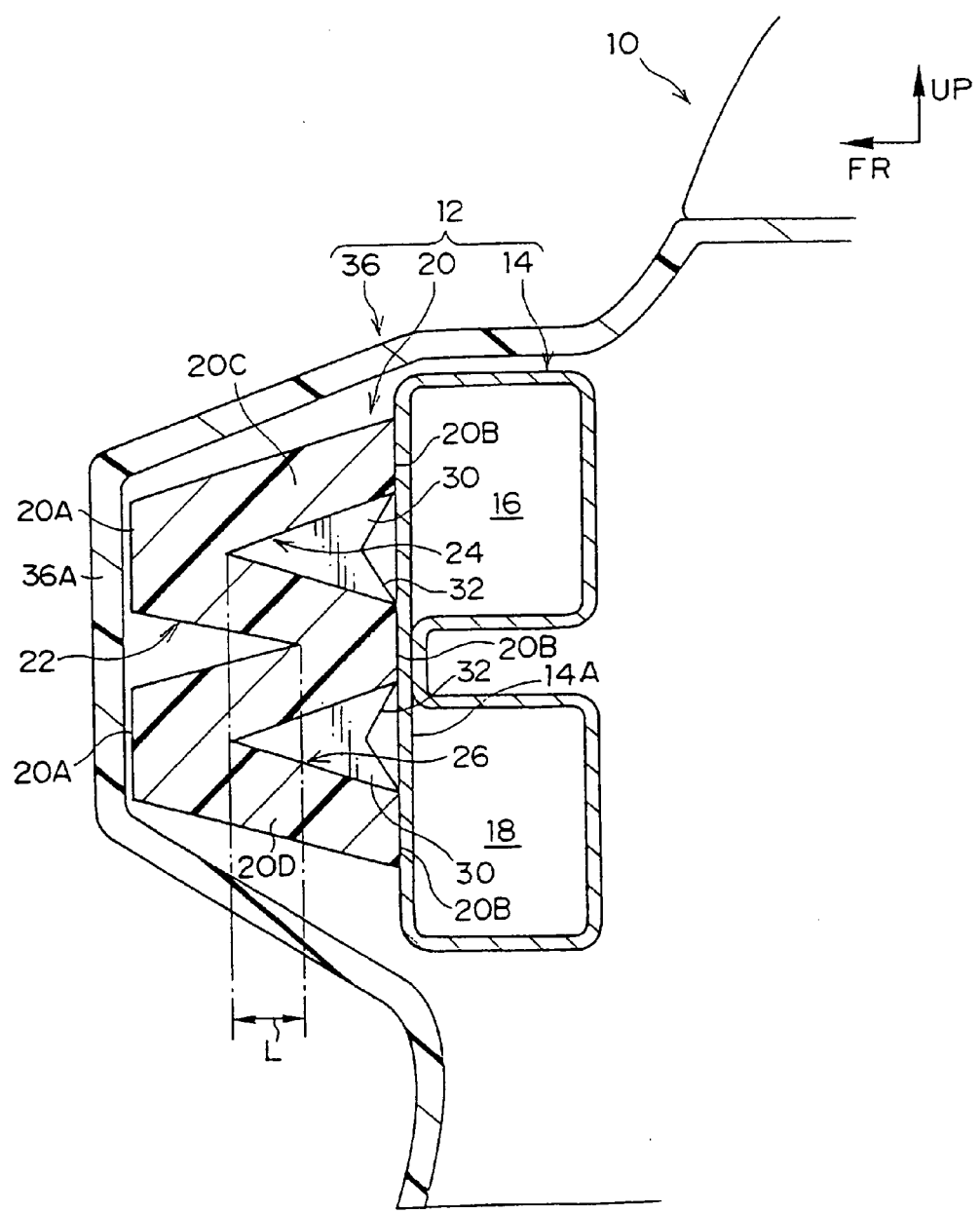
FIG. 1 is an enlarged cross sectional view (taken along a line 1—1 in FIG. 3) of a bumper absorber for protecting pedestrians according to a first embodiment of the present invention.

As shown in FIG. 1, a bumper reinforcement 14 of the front bumper 12 is disposed in the vehicle transverse direction. A cross-sectional configuration of the bumper reinforcement 14 as taken along a direction which is orthogonal to a longitudinal direction of the bumper reinforcement 14, that is, as seen from the vehicle transverse direction, is formed into a configuration having two portions i.e., an upper rectangular closed-cross-sectional portion 16 and a lower rectangular closed-cross-sectional portion 18 which are connected to each other by a front wall portion 14A.

A bumper absorber for protecting pedestrians 20 is disposed at a vehicle front side of the front wall portion 14A of the bumper reinforcement 14 in the vehicle transverse direction. A cross-sectional configuration of the bumper absorber for protecting pedestrians 20 as taken along a direction which is orthogonal to a longitudinal direction of the bumper absorber for protecting pedestrians 20, that is, as seen from a vehicle transverse direction, is formed into a W shape having a portion in which a front notch portion 22, which is notched from a vehicle front side, and an upper rear notch portion 24 and a lower rear notch portion 26, which are notched from a vehicle rear side, overlap with one another in a vehicle vertical direction. A length L expresses the portion overlapped by the front notch portion 22, and the upper rear notch portion 24 and the lower rear notch portion 26.

The bumper absorber for protecting pedestrians 20 is constituted by materials which exhibit both excellent compressive strength and bending strength and are thus able to absorb impact energy. Examples of such materials include a synthetic resin foam such as a polystyrene resin, a polyethylene resin, a polypropylene resin, a polyester resin, a styrene modified polyethylene resin and the like. In particular, use of a mold product of a styrene modified polyethylene resin (styrene content: 50 to 70 wt. %) bead foam is preferable.

Further, ribs 30 as opening controlling means are formed at the upper rear notch portion 24 and the lower rear notch portion 26, respectively, of the bumper absorber for protecting pedestrians 20, and triangular notches 32 are formed from the vehicle rear side at the respective ribs 30.

Figure 2:
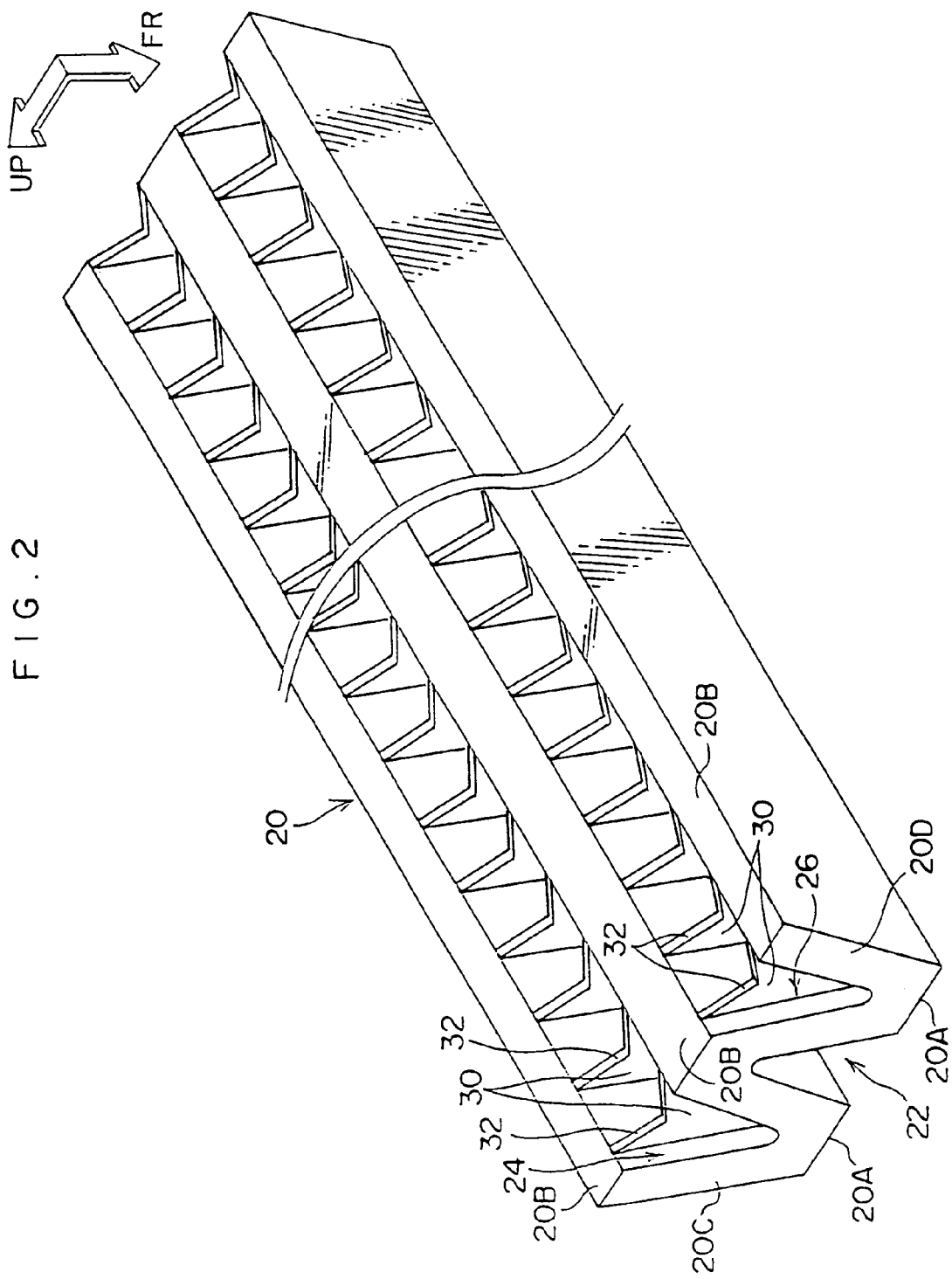
FIG. 2 is a perspective view of the bumper absorber for protecting pedestrians according to the first embodiment of the present invention as seen from a vehicle diagonal rear.

As shown in FIG. 2, the ribs 30 are formed in the upper rear notch portion 24 and the lower rear notch portion 26 so as to be spaced apart from each other at predetermined intervals in a longitudinal direction i.e., the vehicle transverse direction.

As shown in FIG. 1, the bumper reinforcement 14 and the bumper absorber for protecting pedestrians 20 are covered with a bumper cover 36. A front wall portion 36A of the bumper cover 36 and a front wall portion 20A of the bumper absorber for protecting pedestrians 20 face each other. Further, a rear wall portion 20B of the bumper absorber for protecting pedestrians 20 abuts the front wall portion 14A of the bumper reinforcement 14. An upper wall portion 20C and a lower wall portion 20D of the bumper absorber for protecting pedestrians 20 are inclined portions that respectively correspond to an upper portion and a lower portion of the W shape.

Next, an operation of the present embodiment will be explained.

Figure 4A:
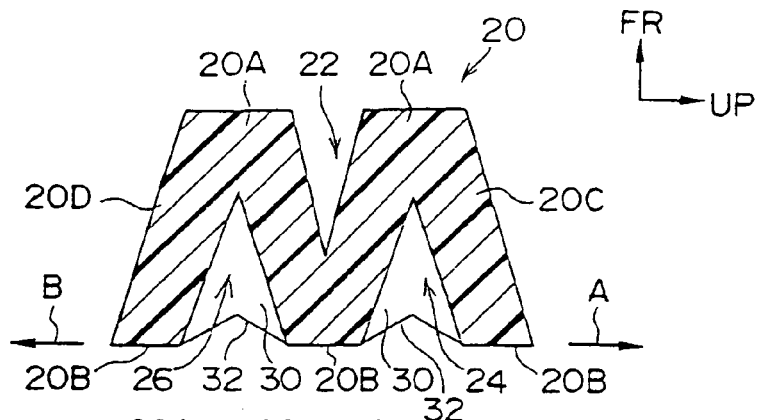
FIGS. 4A to 4D are operational explanatory views of the bumper absorber for protecting pedestrians according to the first embodiment of the present invention.

In the present embodiment, when a pedestrian is hit by the front bumper 12, a load is applied from the vehicle front via the front wall portion 36A of the bumper cover 36 to the bumper absorber for protecting pedestrians 20. At this point, as shown in FIG. 4A, at an initial stage when the load is applied to the bumper absorber for protecting pedestrians 20, as a result of a reaction of the ribs 30 which are respectively formed at the upper rear notch portion 24 and the lower rear notch portion 26, opening of the upper wall portion 20C and the lower wall portion 20D of the bumper absorber for protecting pedestrians 20 or, in other words, an extension of the upper wall portion 20C in a vehicle upper direction (direction of arrow A) and an extension of the lower wall portion 20D in a vehicle lower direction (direction of arrow B), can be suppressively controlled.

Figure 4B:
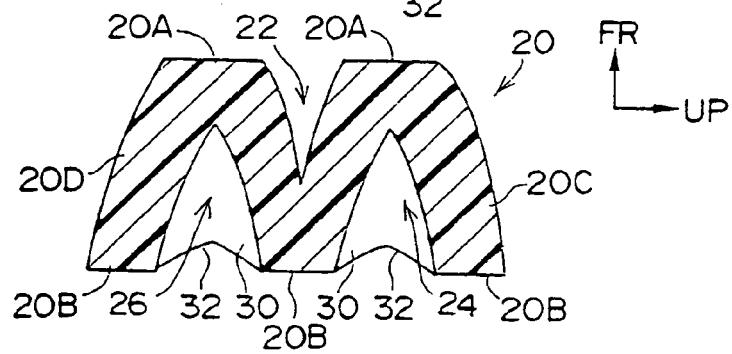

Consequently, the upper wall portion 20C and the lower wall portion 20D of the bumper absorber for protecting pedestrians 20 flex as shown, for example, in FIG. 4B.

Figure 5:
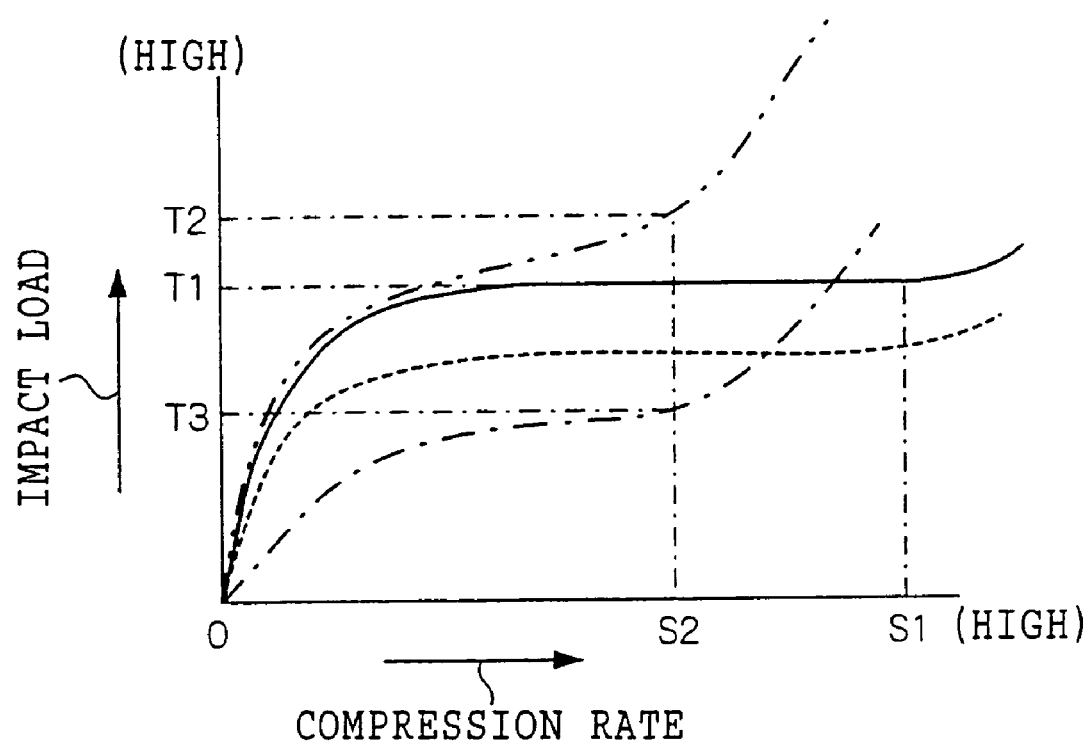
FIG. 5 is a graph of load characteristics of the bumper absorber for protecting pedestrians according to the first embodiment of the present invention.

For this reason, as shown by a solid line in FIG. 5, the rise in load level at an initial stage when an impact load is applied from the vehicle front to the bumper absorber for protecting pedestrians 20 becomes higher than in the case shown by a broken line in FIG. 5 in which the ribs 30 are not formed at the bumper absorber.

Figure 4C:
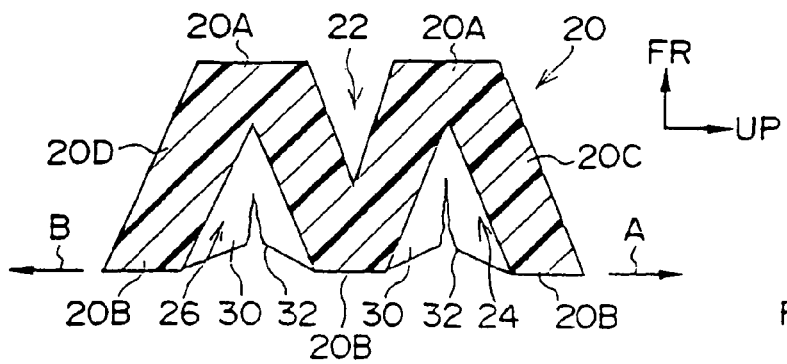
Figure 4D:
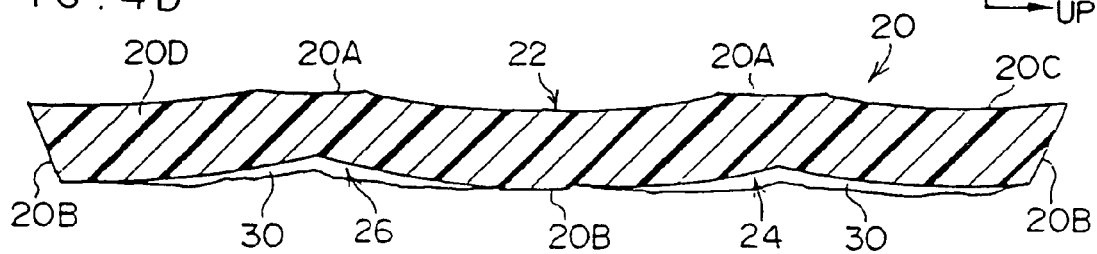

Thereafter, when, as shown in FIG. 4C, the upper wall portion 20C and the lower wall portion 20D of the bumper absorber for protecting pedestrians 20 are bent and deformed to a predetermined amount, each rib 30 is broken, starting with notches 32. Consequently, the upper wall portion 20C extends in the vehicle upper direction (direction of arrow A) and the lower wall portion 20D extends in the vehicle lower direction (direction of arrow B), so that the bumper absorber for protecting pedestrians 20 opens, as shown in FIG. 4D. Then, when the bumper absorber 20 is compressed over its wall thickness, the load is increased.

Accordingly, since the upper wall portion 20C and the lower wall portion 20D of the bumper absorber for protecting pedestrians 20 are not compressed and deformed in the vehicle longitudinal direction, the characteristics of an impact load applied by the bumper absorber for protecting pedestrians 20 on a pedestrian hit by the bumper are as expressed by a solid line in FIG. 5. Accordingly, it is noteworthy that the compression rate at the second-half rise position S1 of an impact load in the case of the bumper absorber 20 is higher than the compression rate at the second-half rise position S2 thereof in the case which is shown by a double-dashed line in FIG. 5, in which a bumper absorber for protecting pedestrians having a rectangular cross sectional configurations used, and also that a load value T1 at the position S1 is smaller than a load value T2 at the position S2.

The dashed line of FIG. 5 expresses load characteristics in a case in which a material density of the bumper absorber for protecting pedestrians having the rectangular cross-sectional configuration as shown by the double-dashed line in FIG. 5 is reduced to ½ (low density). It is noteworthy that a load value T3 at the position S2 is smaller than that of T2.

Accordingly, in the present embodiment, a second-half rise (bottoming) in an impact load acting on a pedestrian who is hit by a bumper can be controlled, and in addition, an initial load can be increased.

Further, since the bumper absorber for protecting pedestrians 20 is structured as described above in the present embodiment, a performance that is requested for protecting pedestrians at respective portions in the vehicle transverse direction (vehicle center portion or vehicle side portions) of the bumper absorber for protecting pedestrians 20 can be realized only by making local changes on the configuration of the W shape, or on configurations and/or intervals of the rib 30 at the respective portions. Accordingly, there is no need for a fundamental change of configuration nor for a degree of forming of the bumper absorber for protecting pedestrians 20.

[Second Embodiment]

Next, with reference to FIG. 6, a bumper absorber for protecting pedestrians according to a second embodiment of the present invention will be explained.

Portions identical to those in the first embodiment of the present invention will be denoted by the same reference numerals and a description thereof will therefore be omitted.

Figure 6:
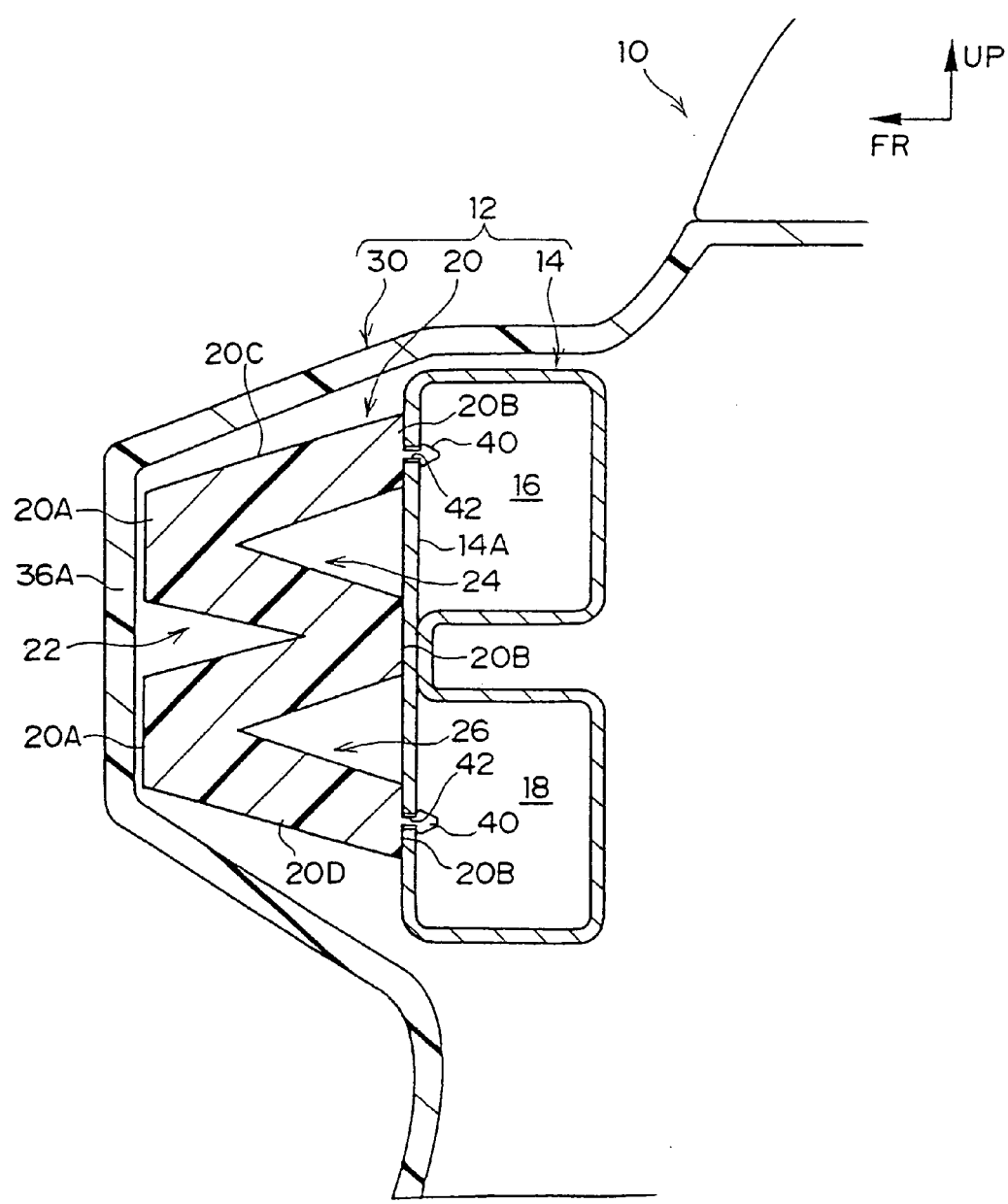
FIG. 6 is a cross-sectional view corresponding to FIG. 1 and showing a bumper absorber for protecting pedestrians according to a second embodiment of the present invention.

As shown in FIG. 6, in the present embodiment, instead of the ribs 30 according to the first embodiment of the present invention, engaging protrusions 40 are formed as opening controlling means (fixing means), respectively at the upper portion and the lower portion of the rear wall portion 20B of the bumper absorber for protecting pedestrians 20. Further, these engaging protrusions 40 are engaged with engaging holes 42 which are formed respectively at the upper portion and the lower portion of the front wall portion 14A of the bumper reinforcement 14. When the upper wall portion 20C and the lower wall portion 20D of the bumper absorber for protecting pedestrians 20 are bent and deformed to a predetermined amount, the engagement between the engaging protrusions 40 and the engaging holes 42 is released.

Next, an operation of the present embodiment will be explained.

In the present embodiment, when a pedestrian is hit by the front bumper 12, a load is applied from the vehicle front via the front wall portion 36A of the bumper cover 36 to the bumper absorber for protecting pedestrians 20. At this point, at an initial stage when a load is applied to the bumper absorber for protecting pedestrians 20, with an engagement of the engaging protrusions 40 of the bumper absorber for protecting pedestrians 20 with the engaging holes 42 of the bumper reinforcement 14, opening of the upper wall portion 20C and the lower wall portion 20D of the bumper absorber for protecting pedestrians 20, namely, an extension of the upper wall portion 20C in the vehicle upper direction and an extension of the lower wall portion 20D in the vehicle lower direction can suppressively be controlled.

Consequently, the upper wall portion 20C and the lower wall portion 20D of the bumper absorber for protecting pedestrians 20 flex. Therefore, as shown by a solid line in FIG. 5, a rise in load level at an initial stage when the load is applied from the vehicle front to the bumper absorber for protecting pedestrians 20 becomes higher than in the case shown by a broken line in FIG. 5 in which the engaging protrusions 40 and the engaging holes 42 are not formed.

Thereafter, when the upper wall portion 20C and the lower wall portion 20D of the bumper absorber for protecting pedestrians 20 are bent and deformed by a predetermined amount, the engagement between the engaging protrusions 40 of the bumper absorber for protecting pedestrians 20 and the engaging holes 42 of the bumper reinforcement 14 is released. As a result, the upper wall portion 20C extends in the vehicle upper direction and the lower wall portion 20D extends in the vehicle lower direction, and the bumper absorber for protecting pedestrians 20 is opened.

In consequence, the upper wall portion 20C and the lower wall portion 20D of the bumper absorber for protecting pedestrians 20 are not compressed and deformed in the vehicle longitudinal direction, and the characteristics of an impact load applied by the bumper absorber for protecting pedestrians 20 on a pedestrian are expressed by a solid line in FIG. 5. It is noteworthy that the compression rate at the second-half rise position S1 of an impact load in the case of the bumper absorber of the present embodiment is higher than the compression rate at the second-half rise position S2 of the impact load in the case shown by a double-dashed line in FIG. 5 in which the bumper absorber for protecting pedestrians having a rectangular cross sectional configuration is used, and that a load value T1 at the position S1 is smaller than a load value T2 at the position S2.

Accordingly, in the present embodiment, a second-half rise (bottoming) in an impact load acting on a pedestrian who is hit by a bumper can be controlled, and in addition, an initial load can be increased.

Further, since, in the present embodiment, the bumper absorber for protecting pedestrians 20 is structured as described above, a performance capability demanded for protecting pedestrians at respective portions in the vehicle transverse direction (vehicle center portion or vehicle side portions) of the bumper absorber for protecting pedestrians 20 can be realized only by making local changes on the configuration of the W shape. Accordingly, there is no need for a fundamental change of configuration nor for a degree of foaming of the bumper absorber for protecting pedestrians 20.

Figure 7:
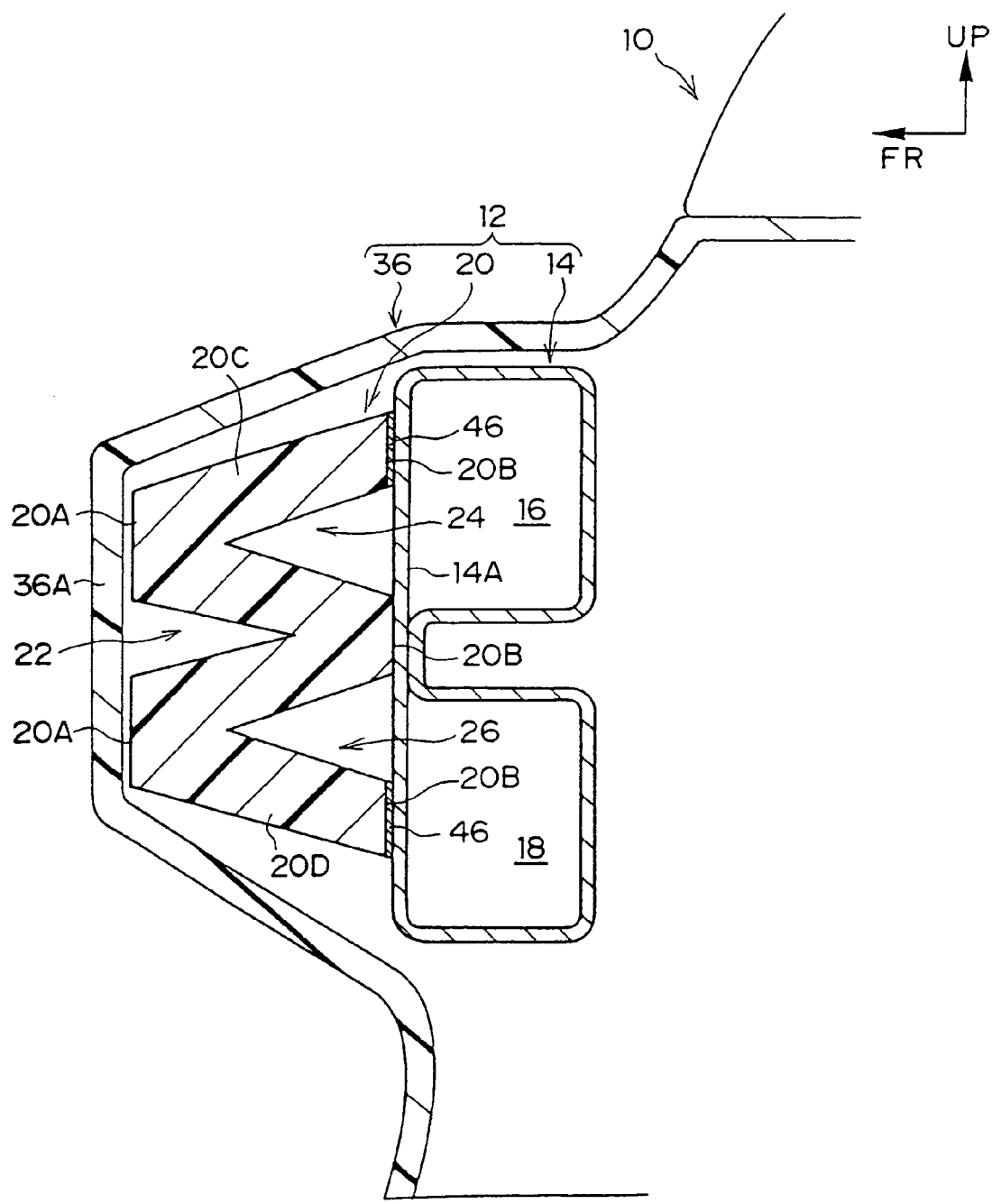
FIG. 7 is a cross-sectional view corresponding to FIG. 1 and showing the bumper absorber for protecting pedestrians according to a modified example of the second embodiment of the present invention.

In the present embodiment, the engaging protrusions 40 of the bumper absorber for protecting pedestrians 20 and the engaging holes 42 of the bumper reinforcement 14 are engaged with each other. However, instead, as shown in FIG. 7, adhesives 46 can be used as the opening controlling means (fixing means) to adhere the upper portion of the rear wall portion 20B of the bumper absorber for protecting pedestrians 20 with the upper portion of the front wall portion 14A of the bumper reinforcement 14, and to adhere the lower portion of the rear wall portion 20B of the bumper absorber for protecting pedestrians 20 with the lower portion of the front wall portion 14A of the bumper reinforcement 14. When the upper wall portion 20C and the lower wall portion 20D of the bumper absorber for protecting pedestrians 20 are bent and deformed to a predetermined amount, the portions adhered by the adhesives 46 can be broken.

[Third Embodiment]

With reference to FIGS. 8A to 8C and FIG. 9, a third embodiment of the present invention of a bumper absorber for protecting pedestrians will be explained, hereinafter.

Portions identical to those in the first embodiment of the present invention will be denoted by the same reference numerals and a description thereof will be omitted.

Figure 8A:
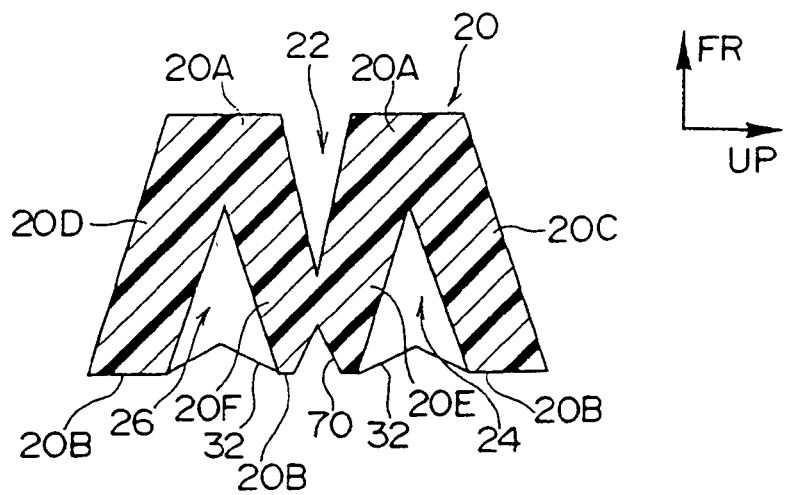
FIG. 8A is a cross-sectional side view of a bumper absorber for protecting pedestrians according to a third embodiment of the present invention.

In the present embodiment, as shown in FIG. 8A, at a linking portion for linking an intermediate wall portion 20E and an intermediate wall portion 20F to one another, a groove 70 having a V-shaped cross-sectional configuration is formed in the vehicle transverse direction so as to oppose the front notch portion 22 (as seen from the bumper reinforcement 14 side) at a central vertical directional central portion of the rear wall portion 20B. The intermediate wall portion 20E and the intermediate wall portion 20F are disposed between the upper wall portion 20C and the lower wall portion 20D of the bumper absorber for protecting pedestrians 20.

Next, an operation of the present embodiment will be explained.

Figure 8B:
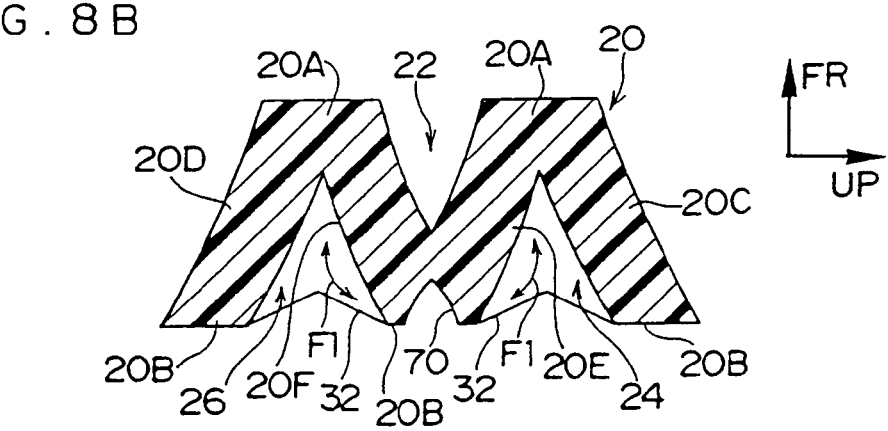
FIGS. 8B and 8C are operational explanatory views corresponding to FIG. 8A and showing the bumper absorber for protecting pedestrians according to the third embodiment of the present invention.

In the same manner as in the first embodiment of the present invention, when a pedestrian is hit by the front bumper 12, a load is applied from the vehicle front via the front wall portion 36A of the bumper cover 36 to the bumper absorber for protecting pedestrians 20. At this time, in the present embodiment, at an initial stage when a load is applied to the bumper absorber for protecting pedestrians 20, as shown in FIG. 8B, at a central portion in the vertical directional of the rear wall portion 20B of the bumper absorber for protecting pedestrians 20, a bending load F1 is easily generated at the intermediate wall portions 20E and 20F of the bumper absorber for protecting pedestrians 20, starting from the groove 70 which has been formed from a side opposite to the front notch portion 22. For this reason, a rise in the initial load level can be increased.

Figure 8C:
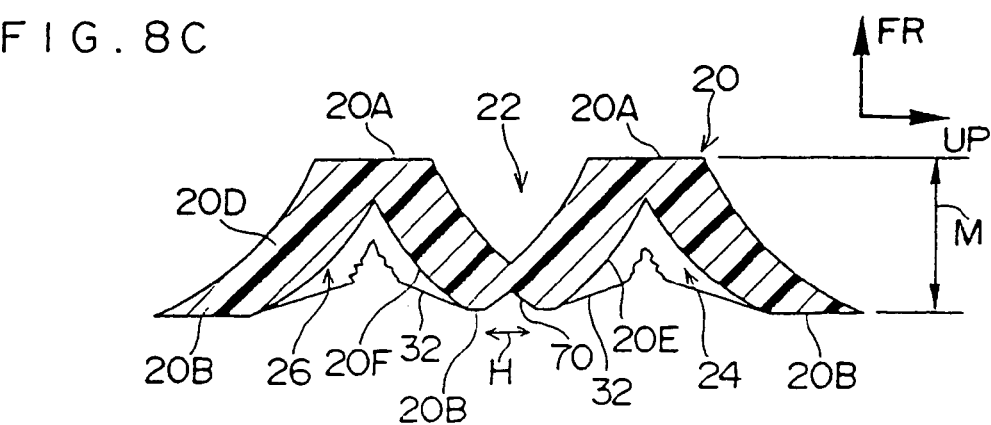

In the final stages of the deformation of the bumper absorber, as shown in FIG. 8C, the rear wall portion 20B, at which the groove 70 is formed, extends in the vertical direction (direction of arrow H), and a remaining thickness M of the bumper absorber for protecting pedestrians 20 which has been compressed, is reduced. Accordingly, the timing at which a bottoming load is generated can be delayed.

Figure 9:
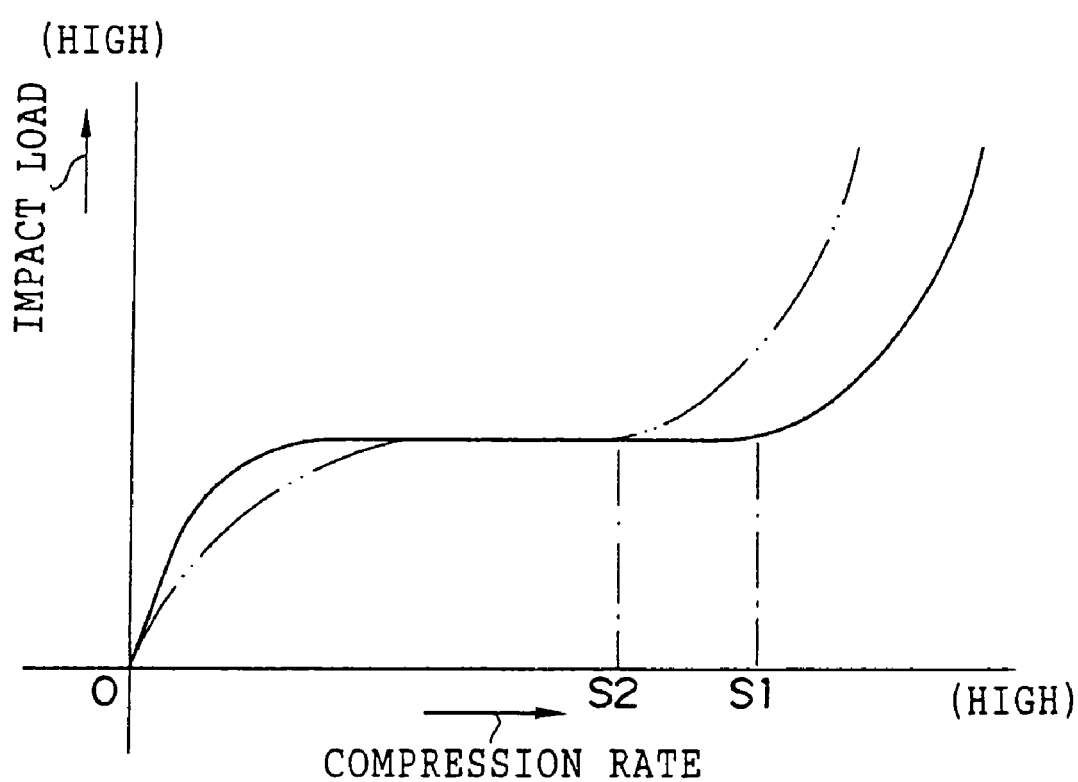
FIG. 9 is a graph of load characteristics of the bumper absorber for protecting pedestrians according to the third embodiment of the present invention.

For this reason, in the present embodiment, as shown by a solid line in FIG. 9, the rise in an impact load at an initial stage when the impact load is applied from the vehicle front to the bumper absorber for protecting pedestrians 20 can be made higher than in the case shown by a double-dashed line in FIG. 9 in which the groove 70 is not formed. Further, the compression rate at the second-half rise position S1 of the impact load in the base of the bumper absorber 20 is higher than the compression rate at the second-half rise position S2 in the case shown by the double-dashed line in FIG. 9 in which the groove 70 is not formed.

Accordingly, in the present embodiment, a second-half rise (bottoming) of an impact load acting on a pedestrian who is hit by a bumper can be controlled, and an initial load can be increased.

Further, in the present embodiment, the groove 70 is formed into a V-shaped cross-sectional configuration. However, the present invention is not limited to this, and instead, the groove 70 can be formed into another cross-sectional configuration such as a U shape or the like.

[Fourth Embodiment]

Figure 10:
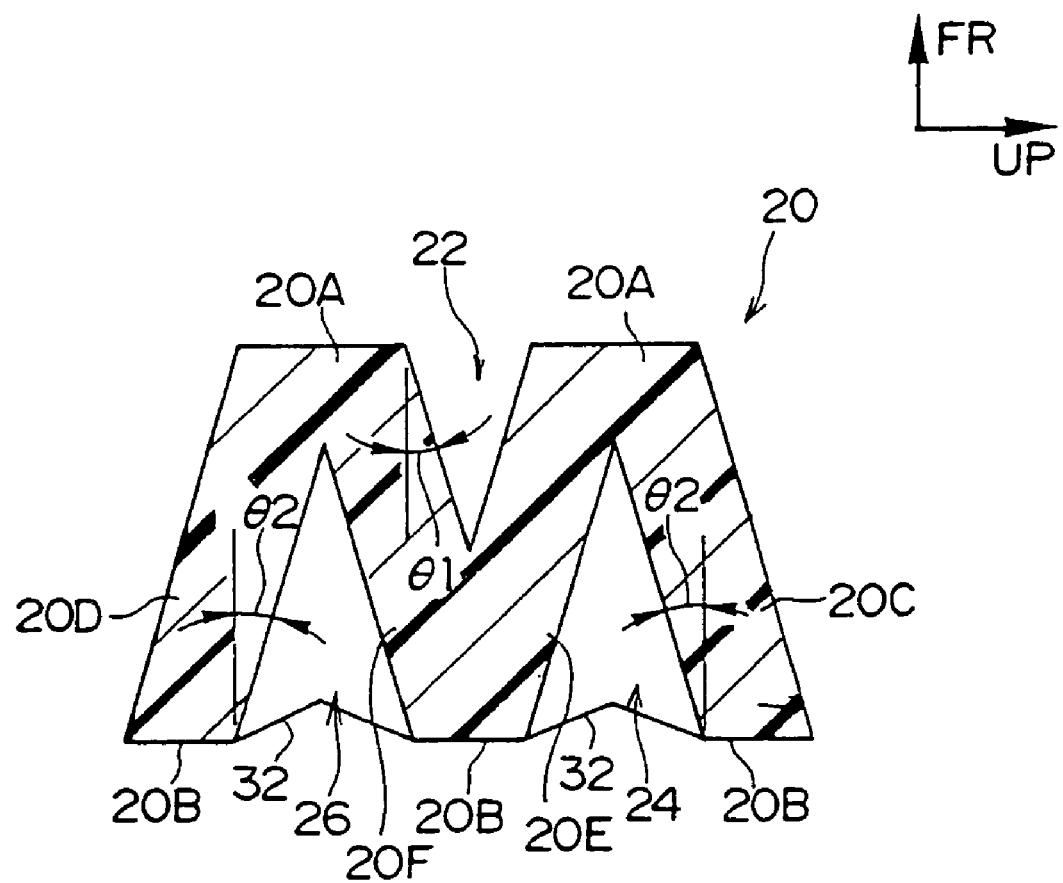
FIG. 10 is a cross-sectional side view of a bumper absorber for protecting pedestrians according to a fourth embodiment of the present invention.

Next, as shown in FIG. 10, a bumper absorber for protecting pedestrians according to a fourth embodiment of the present invention will be explained.

Portions identical to those in the first embodiment of the present invention will be denoted by the same reference numerals and a description thereof will be omitted.

As shown in FIG. 10, in the present embodiment, a cutting edge angle θ1 of the front notch portion 22 of the bumper absorber for protecting pedestrians 20 is from 10° to 15°, and a cutting edge angle θ2 of each of the upper rear notch portion 24 and the lower rear notch portion 26 of the bumper absorber for protecting pedestrians 20 is also from 10° to 15°.

Next, an operation of the present embodiment will be explained.

In the same manner as in the first embodiment of the present invention, when a pedestrian is hit by the front bumper 12, a load is applied from the vehicle front via the front wall portion 36A of the bumper cover 36 to the bumper absorber for protecting pedestrians 20. At this time, in the present embodiment, since the cutting edge angle θ1 of the front notch portion 22, and the cutting edge angle θ2 of each of the upper rear notch portion 24 and the lower rear notch portion 26 have been set at less than 15°, at an initial stage when a load is applied to the bumper absorber for protecting pedestrians 20, the bumper absorber for protecting pedestrians 20 is not easily deformed, and an initial rise in load level can be increased.

In the present embodiment, the cutting edge angle θ1 of the front notch portion 22, and the cutting edge angle θ2 of each of the upper rear notch portion 24 and the lower rear notch portion 26 have been set at more than 10°. Accordingly, in the final stages of the deformation of the bumper absorber, a remaining thickness of the bumper absorber for protecting pedestrians 20 which has been compressed, is reduced, and the timing at which a bottoming load is generated can be delayed.

Thus, in the present embodiment, a rise in the impact load at an initial stage when the impact load is applied from the vehicle front to the bumper absorber for protecting pedestrians 20 can be made higher than that in a case in which the cutting edge angle θ1 of the front notch portion 22 and the cutting edge angle θ2 of each of the upper rear notch portion 24 and the lower rear notch portion 26 have not been set within an angle range of from 10° to 15°. Here, a second-half rise position of the impact load corresponds to a position at which a compression rate is high.

Accordingly, in the present embodiment, a second-half rise (bottoming) in an impact load acting on a pedestrian who is hit by a bumper can be controlled, and an initial load can be increased.

[Fifth Embodiment]

Next, with reference to FIGS. 11A to 11C, and FIG. 12, a bumper absorber for protecting pedestrians according to a fifth embodiment of the present invention will be explained.

Portions identical to those in the first embodiment of the present invention will be denoted by the same reference numerals and a description thereof will be omitted.

Figure 11A:
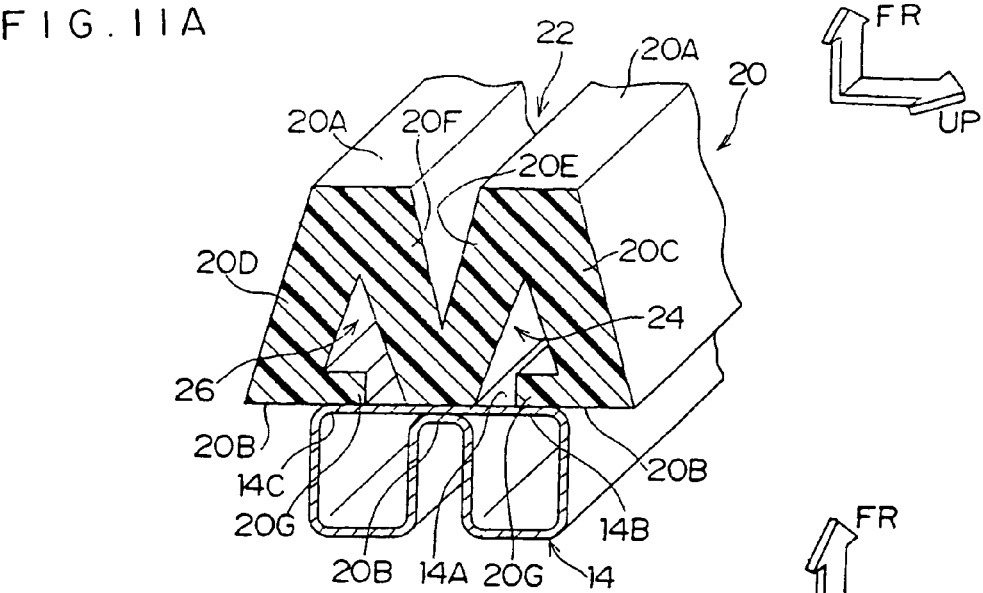
FIG. 11A is a partial cross-sectional perspective view in which a bumper absorber for protecting pedestrians according to a fifth embodiment of the present invention is seen from a vehicle diagonal front.

As shown in FIG. 11A, in the bumper absorber for protecting pedestrians 20 according to the present embodiment, horn portions 20G are formed as convex portions such that one of the horn portions 20G is formed at the inside of the upper rear notch portion 24 so as to extend in the vehicle transverse direction from an end portion at the rear wall portion 20B side of the upper wall portion 20C, and the other horn portion 20G is formed at the inside of the lower rear notch portion 26 so as to extend in the vehicle transverse direction from an end portion at the rear wall portion 20B of the lower wall portion 20D.

Further, an upper end edge portion 14B and a lower end edge portion 14C of the front wall portion 14A of the bumper reinforcement 14 abut the horn portions 20G of the bumper absorber for protecting pedestrians 20, respectively.

Figure 11B:
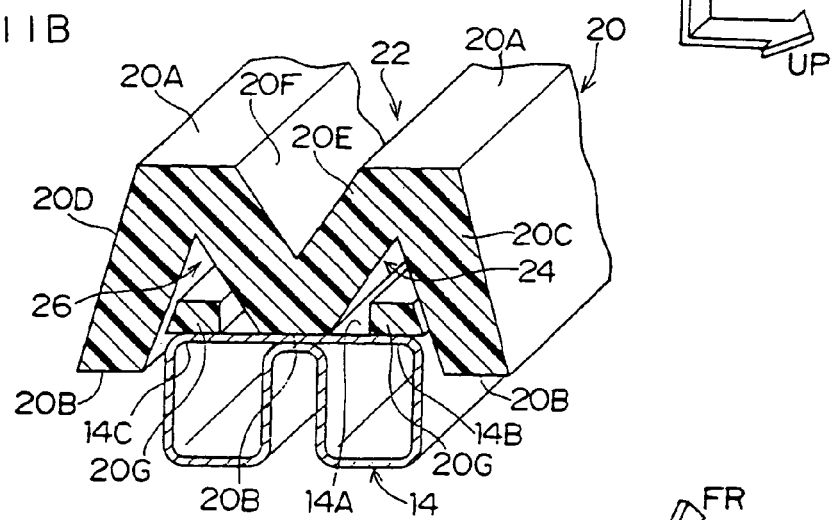
FIGS. 11B and 11C are operational explanatory views corresponding to FIG. 11A and showing the bumper absorber for protecting pedestrians according to the fifth embodiment of the present invention.

As shown in FIG. 11B, when a load having a predetermined value or higher is applied from the vehicle front to the bumper absorber for protecting pedestrians 20, the horn portions 20G of the bumper absorber for protecting pedestrians 20 are pressed and broken by the bumper reinforcement 14.

Next, an operation of the present embodiment will be explained.

In the same manner as in the first embodiment of the present invention, when a pedestrian is hit by the front bumper 12, a load is applied from the vehicle front via the front wall portion 36A of the bumper cover 36 to the bumper absorber for protecting pedestrians 20. At this point, as shown in FIG. 11A, at an initial stage when the load is applied to the bumper absorber for protecting pedestrians 20, since the upper end edge portion 14B and the lower end edge portion 14C of the front wall portion 14A of the bumper reinforcement 14 respectively abut the horn portions 20G of the bumper absorber for protecting pedestrians 20, a bending load is easily generated at the upper wall portion 20C and the lower wall portion 20D, respectively, of the bumper absorber for protecting pedestrians 20, starting from each of the horn portions 20G. Accordingly, an initial rise in load level can be increased.

Figure 11C:
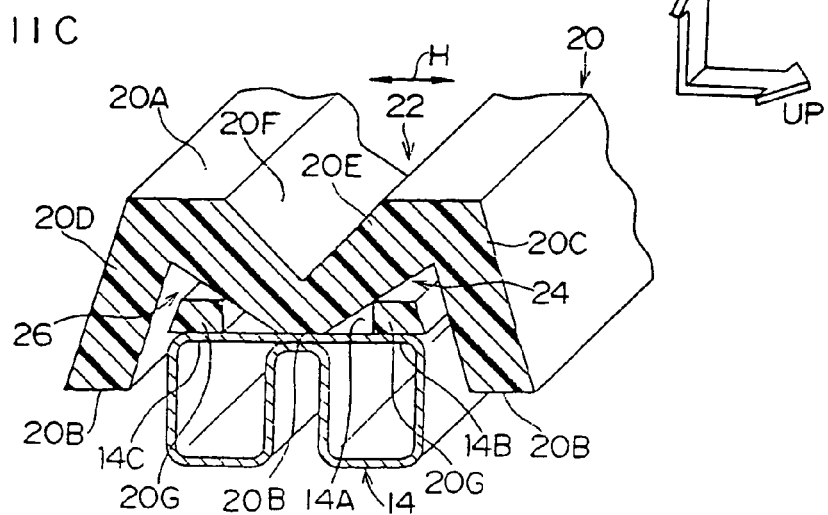

Further, in the final stages of the deformation of the bumper absorber, as shown in FIG. 11B, the horn portions 20G of the bumper absorber for protecting pedestrians 20 are pressed and broken by the bumper reinforcement 14. For this reason, the bumper reinforcement 14 enters between the upper wall portion 20C and the lower wall portion 20D of the bumper absorber for protecting pedestrians 20, and as shown in FIG. 11C, the upper wall portion 20C and the lower wall portion 20D extend respectively in the vertical direction (direction of arrow H). Therefore, a remaining thickness of the bumper absorber for protecting pedestrians 20 which has been compressed, is reduced and the timing at which a bottoming load is generated can be delayed.

Figure 12:
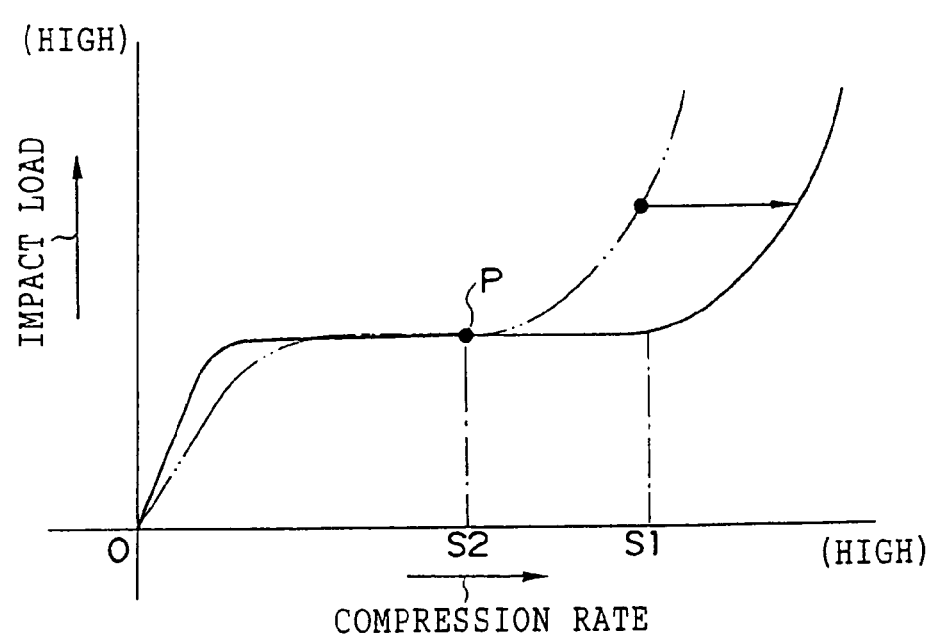
FIG. 12 is a graph of load characteristics of the bumper absorber for protecting pedestrians according to the fifth embodiment of the present invention.

In the present embodiment, as shown by a solid line in FIG. 12, a rise in the impact load at an initial stage when the impact load is applied from the vehicle front to the bumper absorber for protecting pedestrians 20 can be made higher than that in the case which is shown by a double-dashed line in FIG. 12 in which the horn portions 20G are not formed. Further, the compression rate at the second-half rise position S1 of the impact load in the case of the bumper absorber 20 is higher than the compression rate at a broken point P of the horn portions 20G. Accordingly, the compression rate of the second-half rise position S1 in the case of the bumper absorber 20 is higher than the compression rate at the second-half rise position S2 of the impact load in a case in which the horn portions 20G are not formed.

Accordingly, in the present embodiment, a second-half rise (bottoming) in an impact load acting on a pedestrian who is hit by a bumper can be controlled, and an initial load can be increased.

Figure 13:
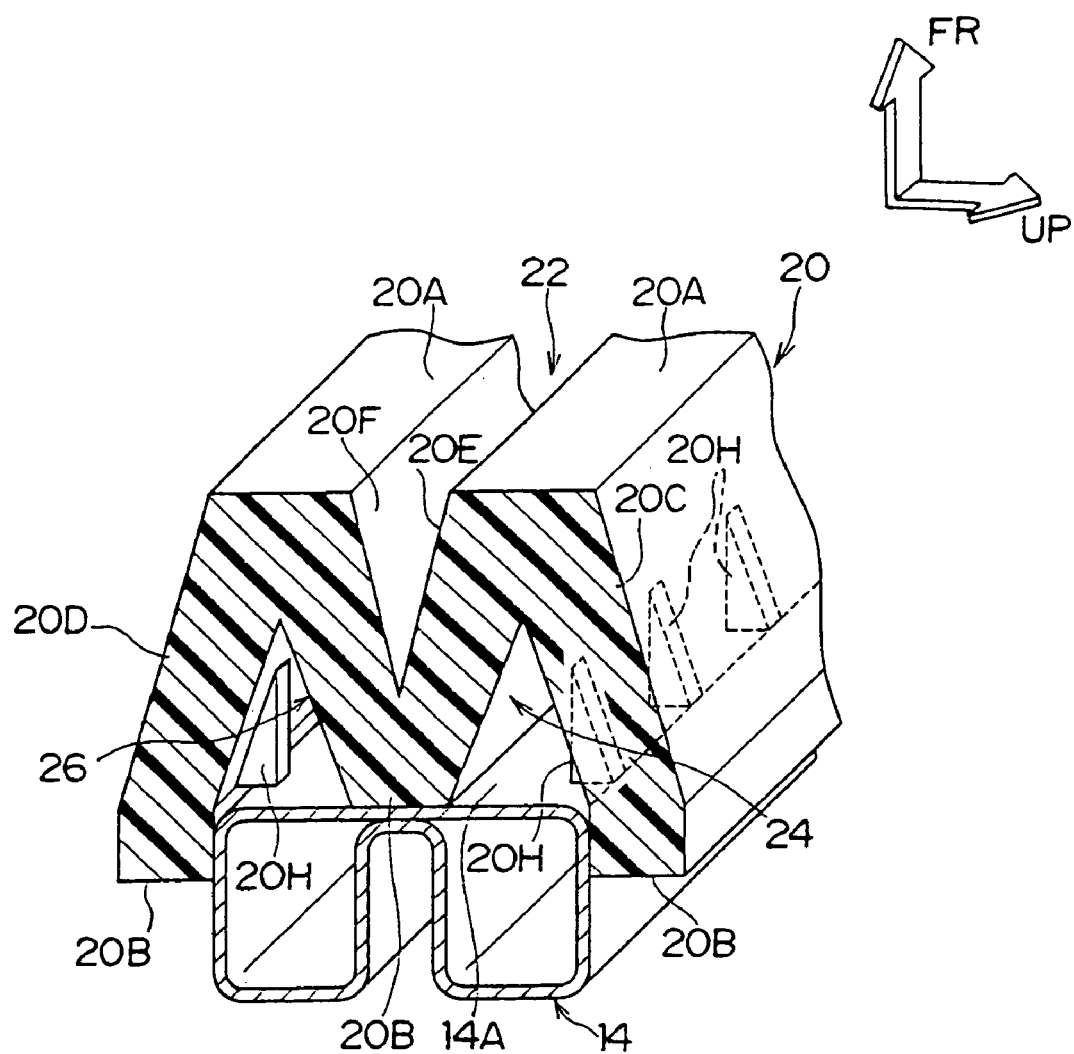
FIG. 13 is a partial cross-sectional perspective view of a bumper absorber for protecting pedestrians according to a modified example of the fifth embodiment of the present invention, as seen from a vehicle diagonal front.

Moreover, in the present embodiment, the horn portions 20G are formed as convex portions at the bumper absorber for protecting pedestrians 20. However, the convex portions are not limited to the horn portions 20D, and instead, as shown in FIG. 13, other convex portions such as ribs 20H which are formed in the vehicle transverse direction so as to be apart from one another at predetermined intervals can be formed at the bumper absorber for protecting pedestrians 20.

[Sixth Embodiment]

Next, with reference to FIG. 14 and FIG. 15, a bumper absorber for protecting pedestrians according to a sixth embodiment of the present invention will be explained.

Portions identical to those in the first embodiment of the present invention will be denoted by the same reference numerals and a description thereof will be omitted.

Figure 14:
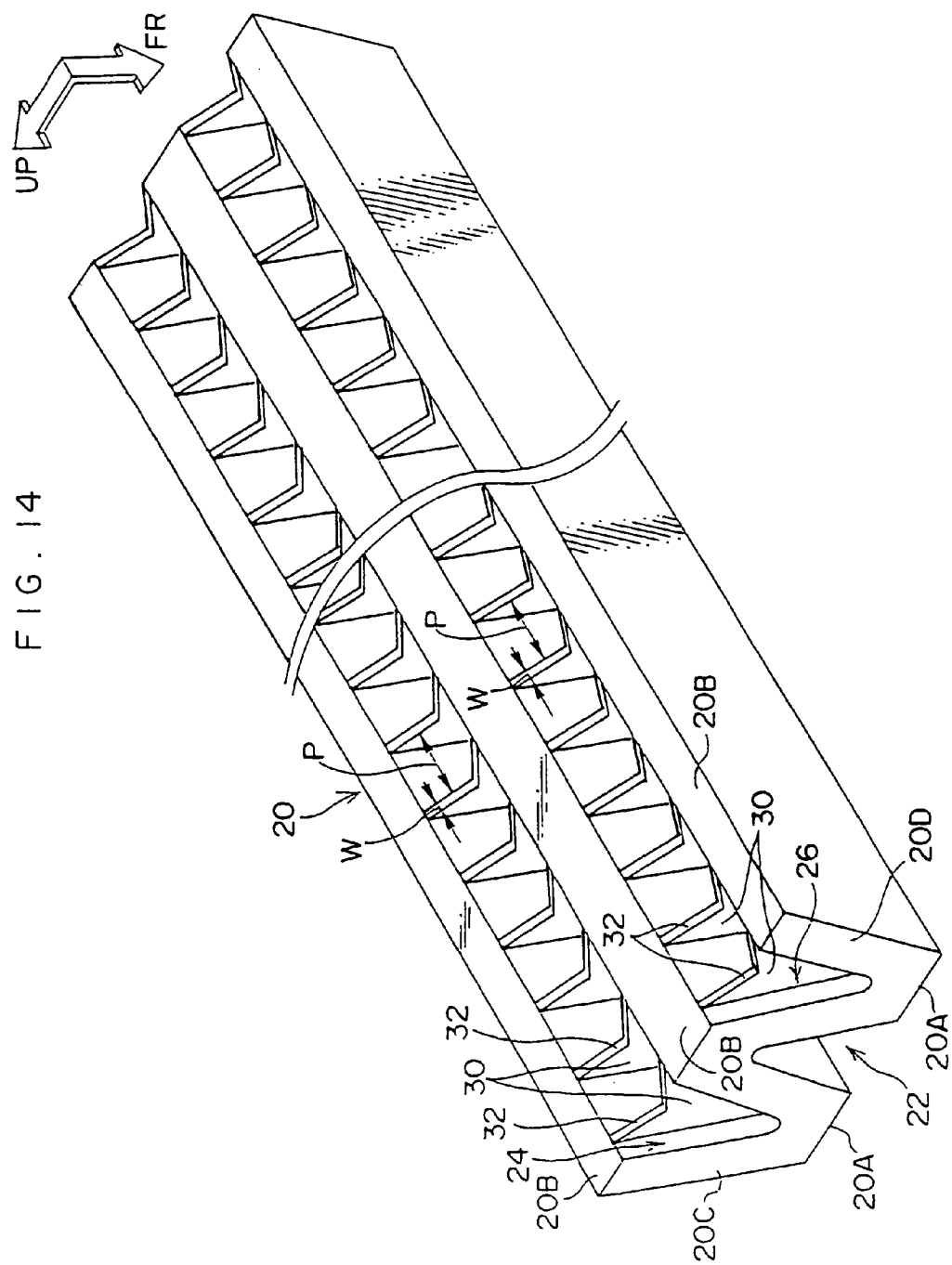
FIG. 14 is a perspective view of a bumper absorber for protecting pedestrians according to a sixth embodiment of the present invention, as seen from a vehicle diagonal rear.

As shown in FIG. 14, in the present embodiment, a width W of one rib 30 at the bumper absorber for protecting pedestrians 20 is 5 mm to 10 mm, and each distance P between the ribs 30 is 30 mm to 50 mm.

Next, an operation of the present embodiment will be explained.

In the present embodiment, as shown in FIG. 15, the width W of one rib 30 at the bumper absorber for protecting pedestrians 20 is 5 mm to 10 mm, and the distance P between the ribs 30 is 30 mm to 50 mm. As a result, when the compression rate in the vehicle longitudinal direction of the bumper absorber for protecting pedestrians 20 is 50%, the required impact load value T1 of the present embodiment is increased by about 40% more than the impact load value T2 required in the case when the ribs 30 are not formed at the bumper absorber for protecting pedestrians 20. Accordingly, energy absorbing performance can be improved.

In the above description, a more detailed description of the specified embodiments of the present invention has been given. However, the present invention is not limited to these embodiments. It is apparent for those skilled in the art that various other embodiments can be enabled as long as they are within the spirit of the invention. Such embodiments will be explained with reference to the seventh to twelfth embodiments, which follow.

[Seventh Embodiment]

Figure 16:
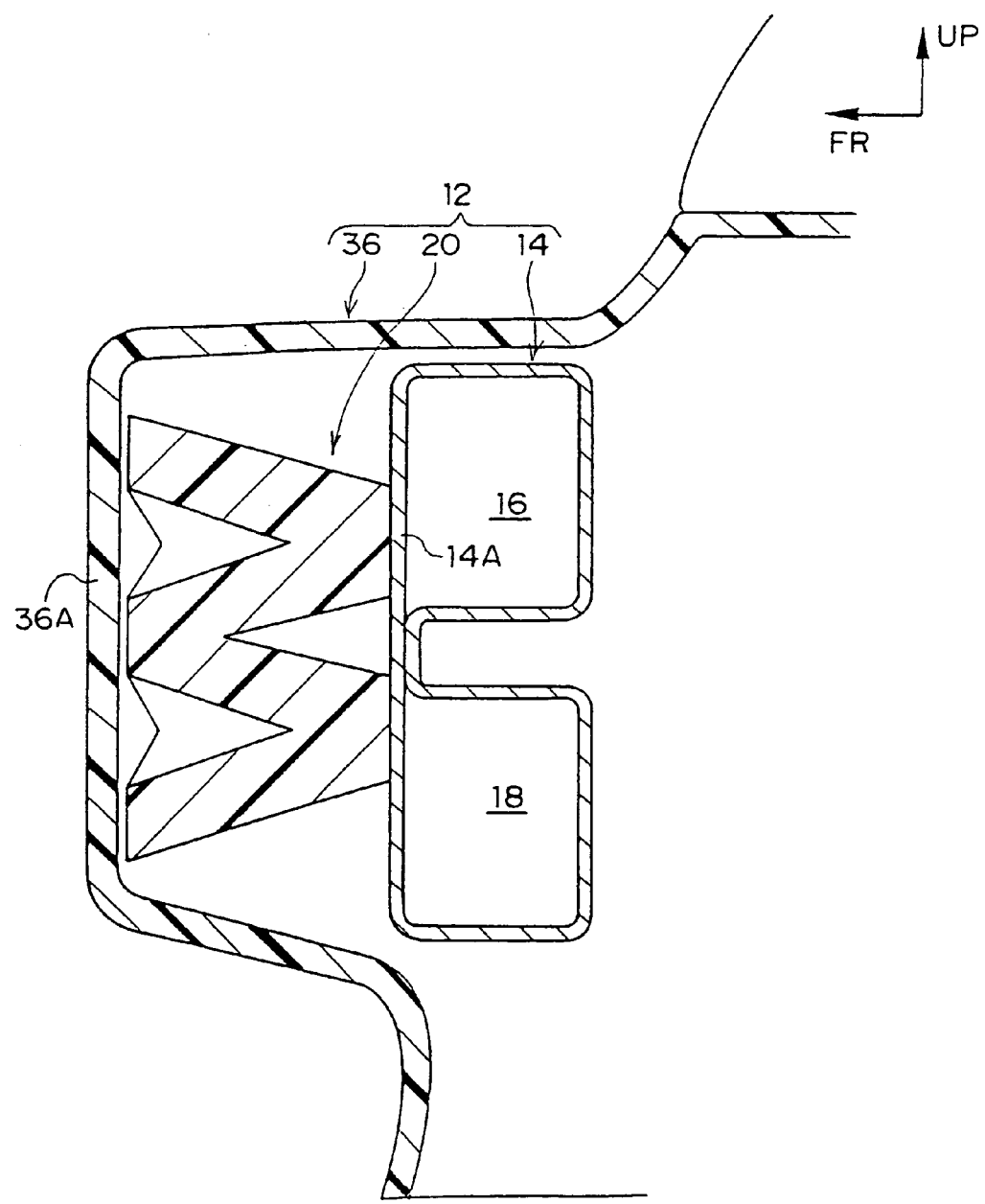
FIG. 16 is a cross-sectional view corresponding to FIG. 1 and showing a bumper absorber for protecting pedestrians according to a seventh embodiment of the present invention.

As shown in FIG. 16, the bumper absorber for protecting pedestrians 20 can be structured such that an orientation of the bumper absorber for protecting pedestrians 20 in the vehicle longitudinal direction is inverted.

[Eighth Embodiment]

In each of the above-described embodiments, a cross-sectional configuration, as taken along a direction which is orthogonal to a longitudinal direction of the bumper absorber for protecting pedestrians 20, is formed into a W shape having a portion in which the front notch portion 22, notched from the vehicle front side, and the upper rear notch portion 24 and the lower rear notch portion 26, notched from the vehicle rear side, overlap with one another in the vehicle vertical direction. However, the cross section of the bumper absorber for protecting pedestrians 20 is not limited to the W shape.

Figure 17:
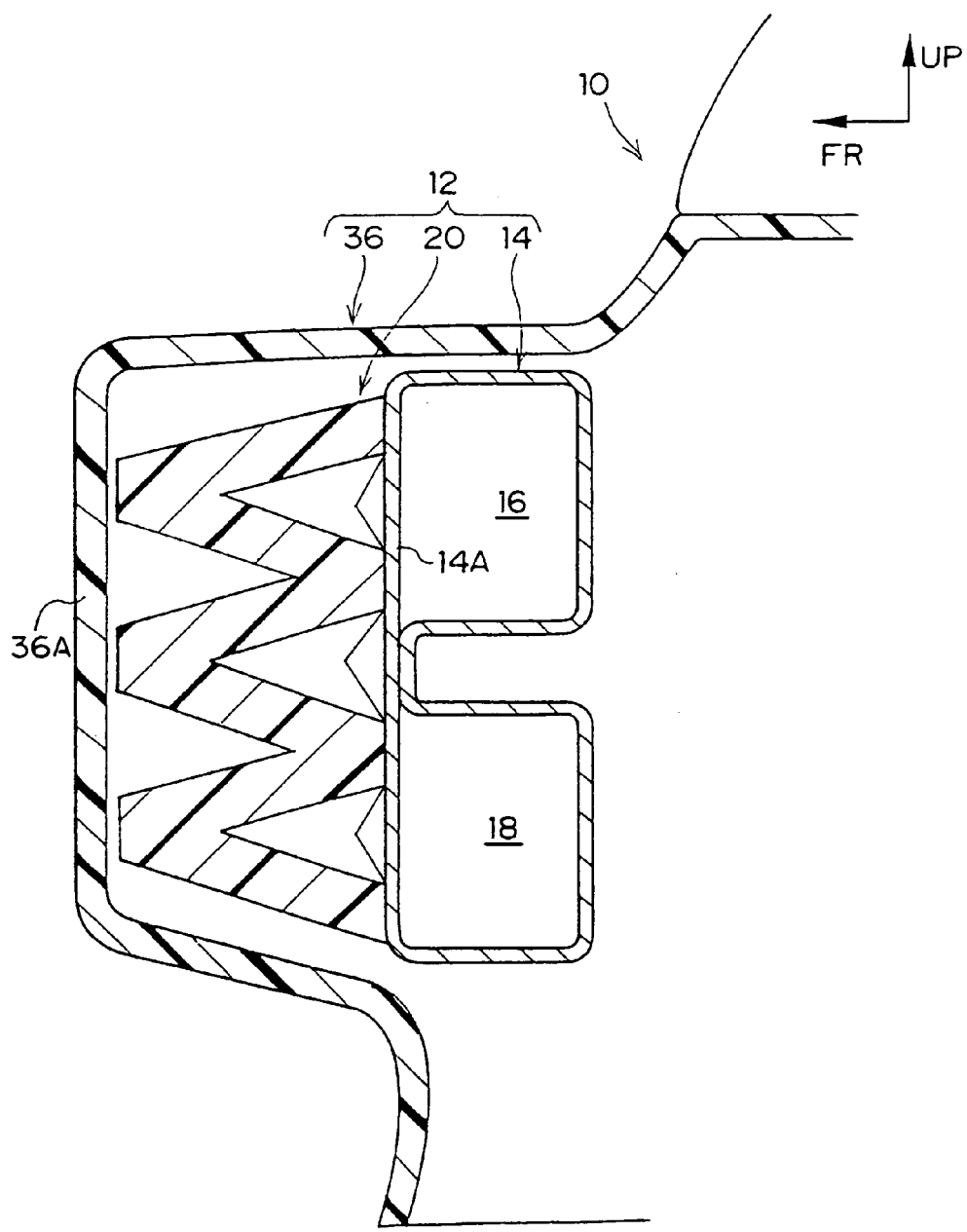
FIG. 17 is a cross-sectional view which corresponds to FIG. 1 and showing a bumper absorber for protecting pedestrians according to an eighth embodiment of the present invention.

Accordingly, as shown in FIG. 17, the cross-sectional configuration of the bumper absorber for protecting pedestrians 20, as taken along a direction orthogonal to a longitudinal direction of the bumper absorber, can be formed into a zigzag shape.

[Ninth Embodiment]

Figure 18:
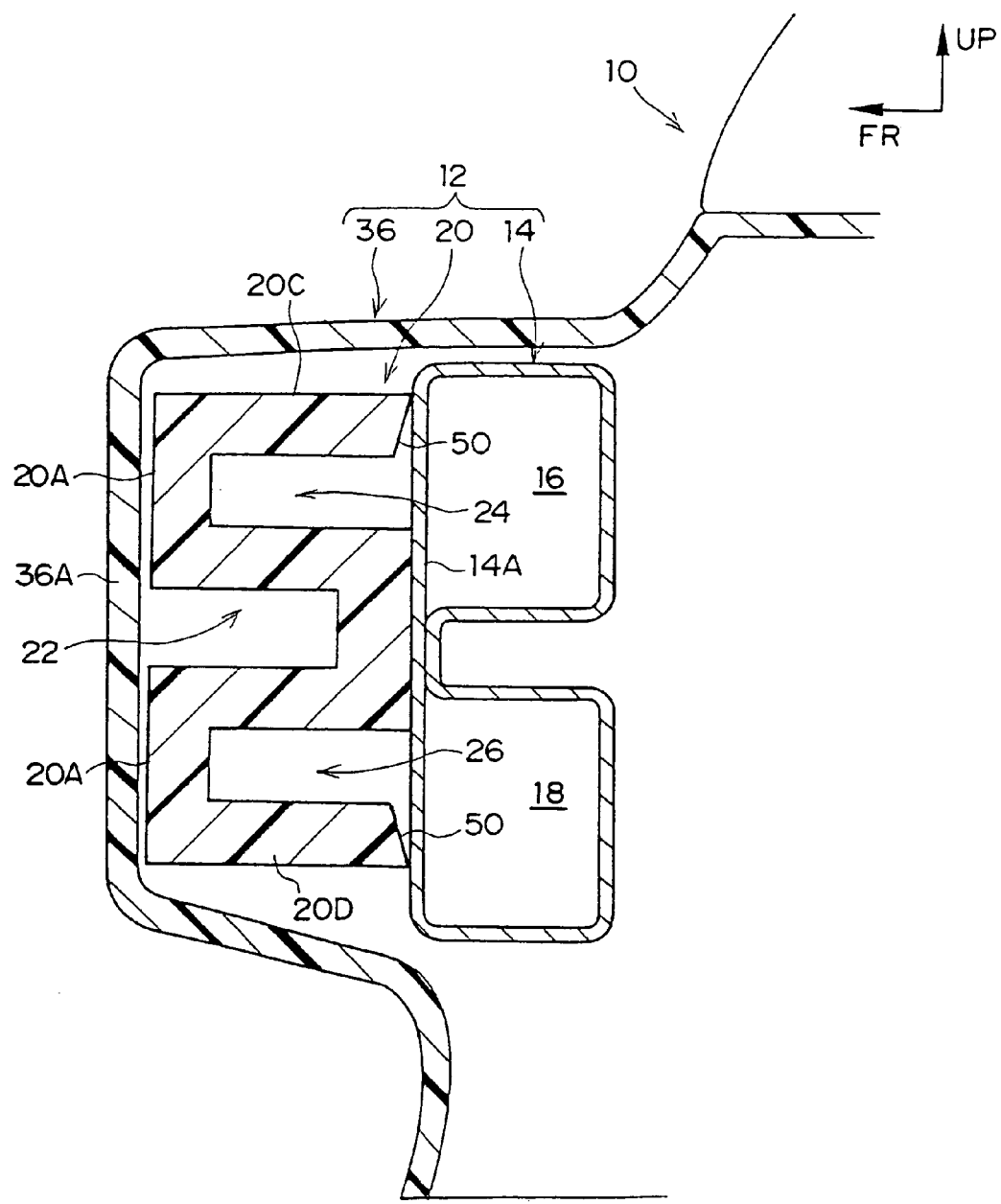
FIG. 18 is a cross-sectional view corresponding to FIG. 1 and showing a bumper absorber for protecting pedestrians according to a ninth embodiment of the present invention.

As shown in FIG. 18, the cross-sectional configuration of the bumper absorber for protecting pedestrians 20, as taken along a direction orthogonal to a longitudinal direction of the bumper absorber, can be formed into a crank shape having a portion in which the front notch portion 22, notched from the vehicle front side, and the upper rear notch portion 24 and the lower rear notch portion 26, notched from the vehicle rear side, overlap with one another in the vehicle vertical direction.

In this case, further, an inclination surface 50 can be formed as opening means at a portion at which the upper wall portion 20C and the lower wall portion 20D of the bumper absorber for protecting pedestrians 20 abut the front wall portion 14A of the bumper reinforcement 14. When a load having a predetermined value or higher is applied from the vehicle front to the bumper absorber for protecting pedestrians 20, the inclination surface 50 moves the upper wall portion 20C of the bumper absorber for protecting pedestrians 20 in the vehicle upper direction and the lower wall portion 20D of the bumper absorber for protecting pedestrians 20 in the vehicle lower direction, respectively, and, in other words, opens the upper wall portion 20C and the lower wall portion 20D in the vehicle vertical direction.

[Tenth Embodiment]

As shown in FIGS. 19A to 19C, in order to contribute to boosting a rise in the level of load applied at an initial stage and an increase in an impact absorbing amount after the upper wall portion 20C and the lower wall portion 20D have been opened in the vehicle vertical direction, a plurality of convex portions 60 can be formed at the upper side of the upper wall portion 20C and the lower side of the lower wall portion 20D of the bumper absorber for protecting pedestrians 20 so as to be spaced apart from each other in the vehicle transverse direction at predetermined intervals.

[Eleventh Embodiment]

Next, with reference to FIGS. 20 to 24, a bumper absorber for protecting pedestrians according to an eleventh embodiment of the present invention will be explained.

In these figures, arrow "UP" indicates a vehicle upper direction and arrow "FR" indicates a vehicle front direction. In addition, portions identical to those in the first embodiment of the present invention will be denoted by the same reference numerals.

Figure 24:
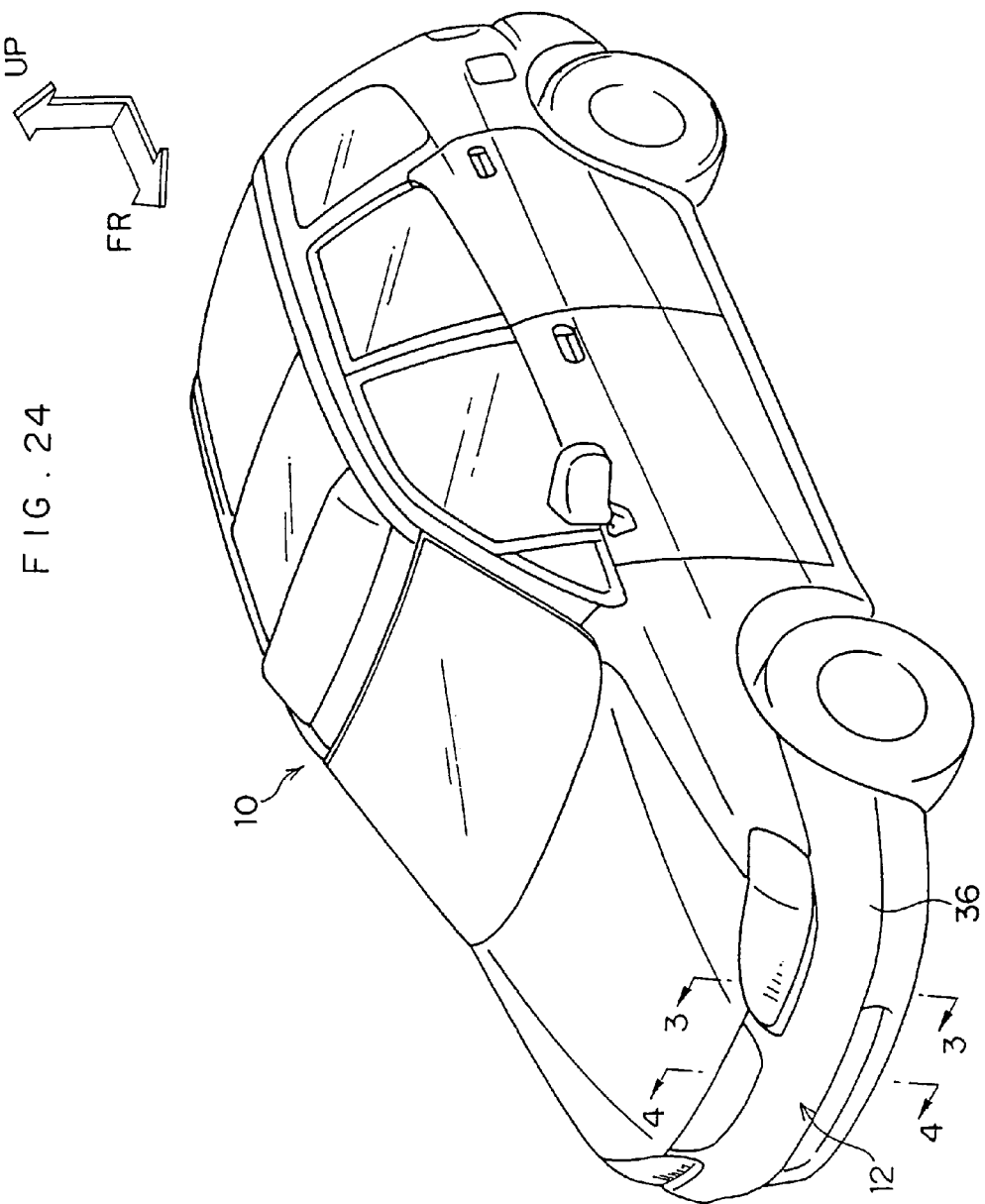
FIG. 24 is a perspective view of a vehicle body seen from a vehicle diagonal front, in which vehicle the bumper absorber for protecting pedestrians according to the eleventh embodiment of the present invention is adopted.

As shown in FIG. 24, in the present embodiment, the front bumper 12 is disposed at the lower front end portion of the vehicle body 10 of an automobile in the vehicle transverse direction.

Figure 22:
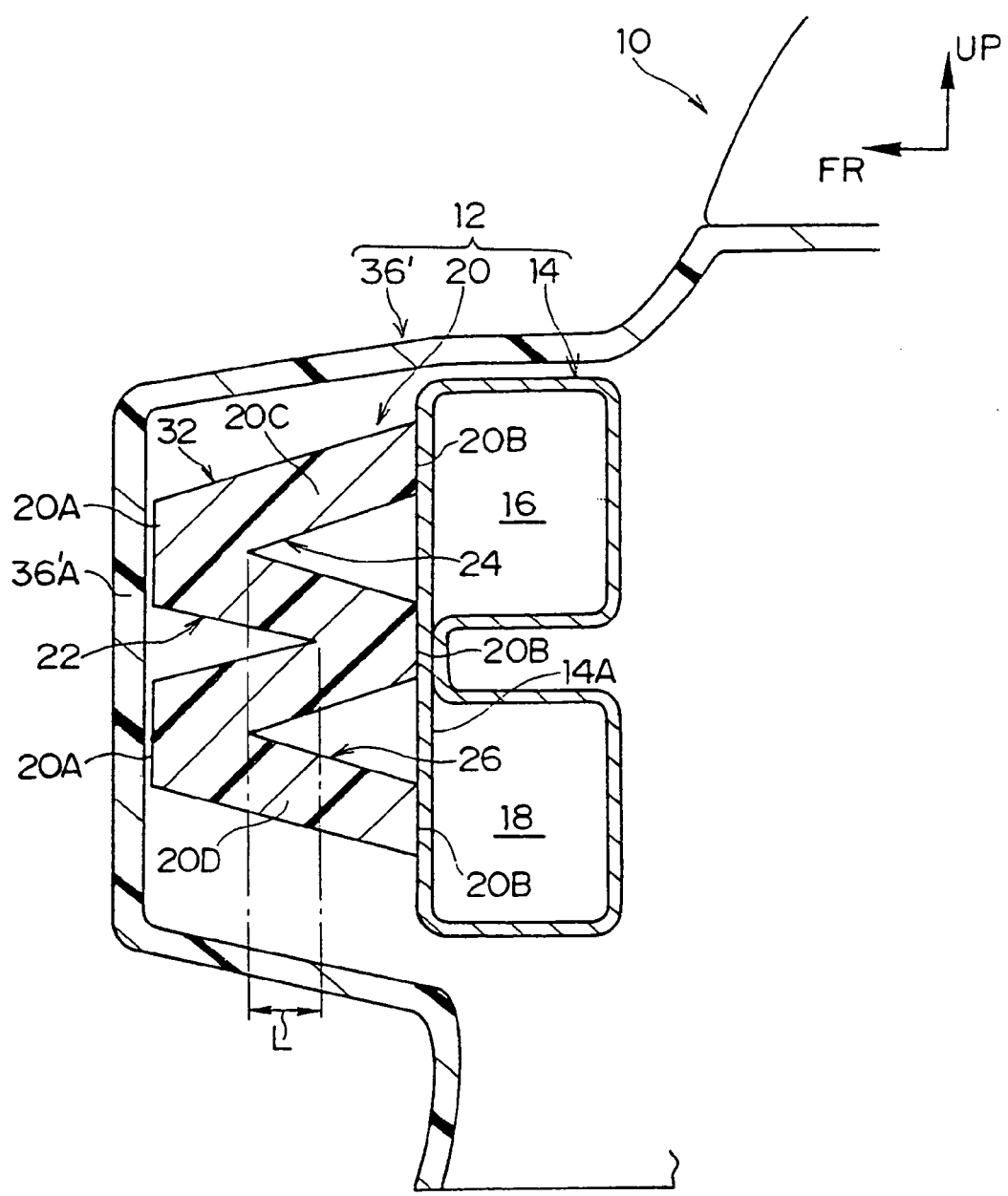
FIG. 22 is an enlarged cross-sectional view (taken along a line 3—3 in FIG. 24) of the bumper absorber for protecting pedestrians according to the eleventh embodiment of the present invention.

As shown in FIG. 22, the bumper reinforcement 14 of the front bumper 12 is disposed in the vehicle transverse direction. The cross section of the bumper reinforcement 14, as taken along a direction which is orthogonal to the longitudinal direction of the bumper reinforcement 14, i.e., as seen from the vehicle transverse direction, is formed into a configuration in which the two upper and lower rectangular closed cross-sectional portions 16 and 18 are connected by the front wall portion 14A. Further, the bumper absorber for protecting pedestrians 20 is disposed at the vehicle front side surface of the front wall portion 14A of the bumper reinforcement 14.

Figure 20:
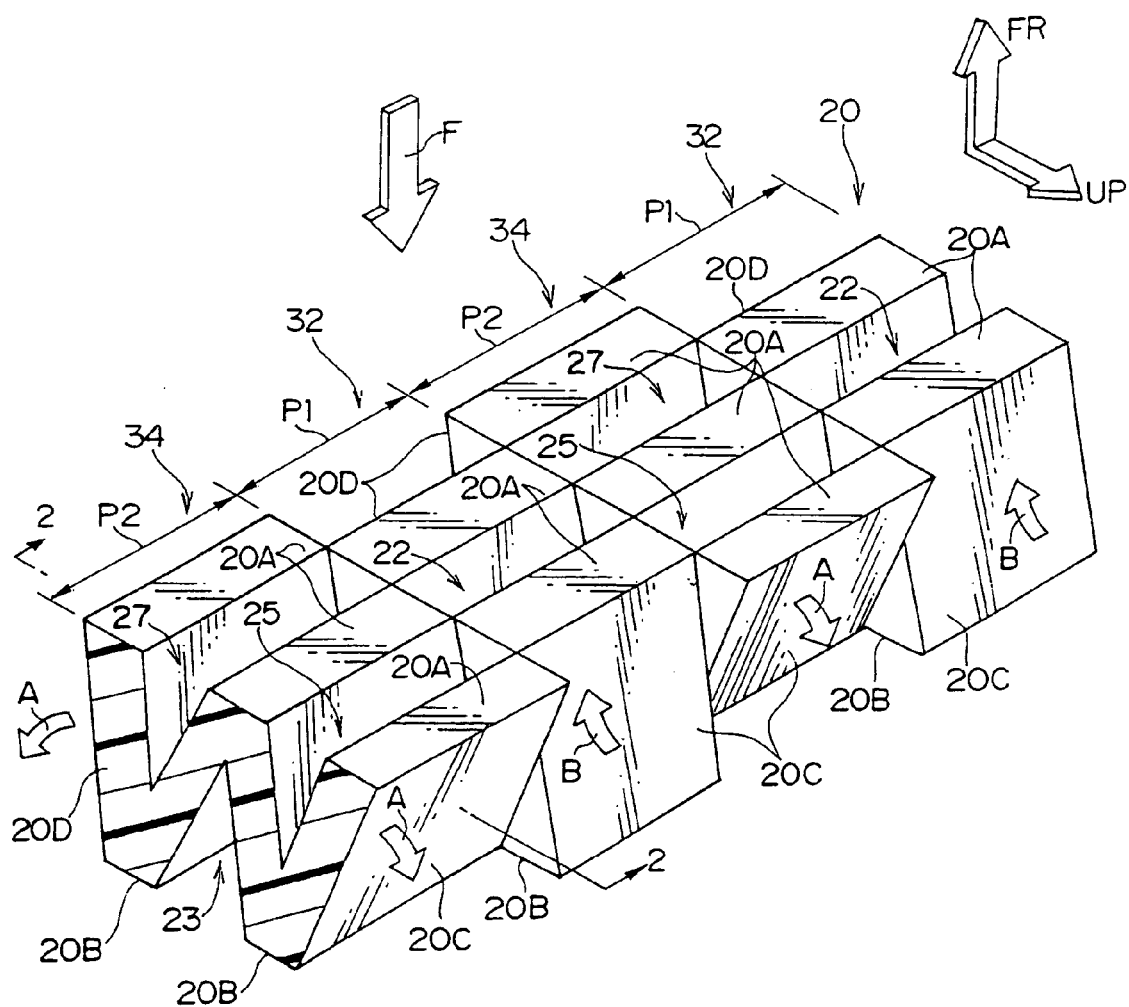
FIG. 20 is a perspective view of a bumper absorber for protecting pedestrians according to an eleventh embodiment of the present invention, as seen from a vehicle diagonal front.

As shown in FIG. 20, the cross-sectional configuration of the bumper absorber 20, as taken along the direction which is orthogonal to the longitudinal direction of the bumper absorber (vehicle transverse direction), is formed into a W shape. The orientations of W shapes in the front-rear direction of the bumper absorber are inverted in the vehicle transverse direction at predetermined intervals. Namely, in the bumper absorber for protecting pedestrians 20, ordinary portions 32 each corresponding to a length P1 in the vehicle transverse direction, and inverted portions 34 each corresponding to a length P2 in the vehicle transverse direction are alternately formed in the vehicle transverse direction.

As shown in FIG. 22, in an ordinary portion 32 of the bumper absorber for protecting pedestrians 20, the cross sectional configuration of the bumper absorber 20 as seen from the vehicle transverse direction is formed into a W shape having a portion in which the front notch portion 22 notched from the vehicle front side and the upper rear notch portion 24 and the lower rear notch portion 26 notched from the vehicle rear side overlap with one another in the vehicle vertical direction, and the length of the portion at which the front notch portion 22, and the upper rear notch portion 24 and the lower rear notch portion 26 overlap with one another is expressed by L.

Figure 23:
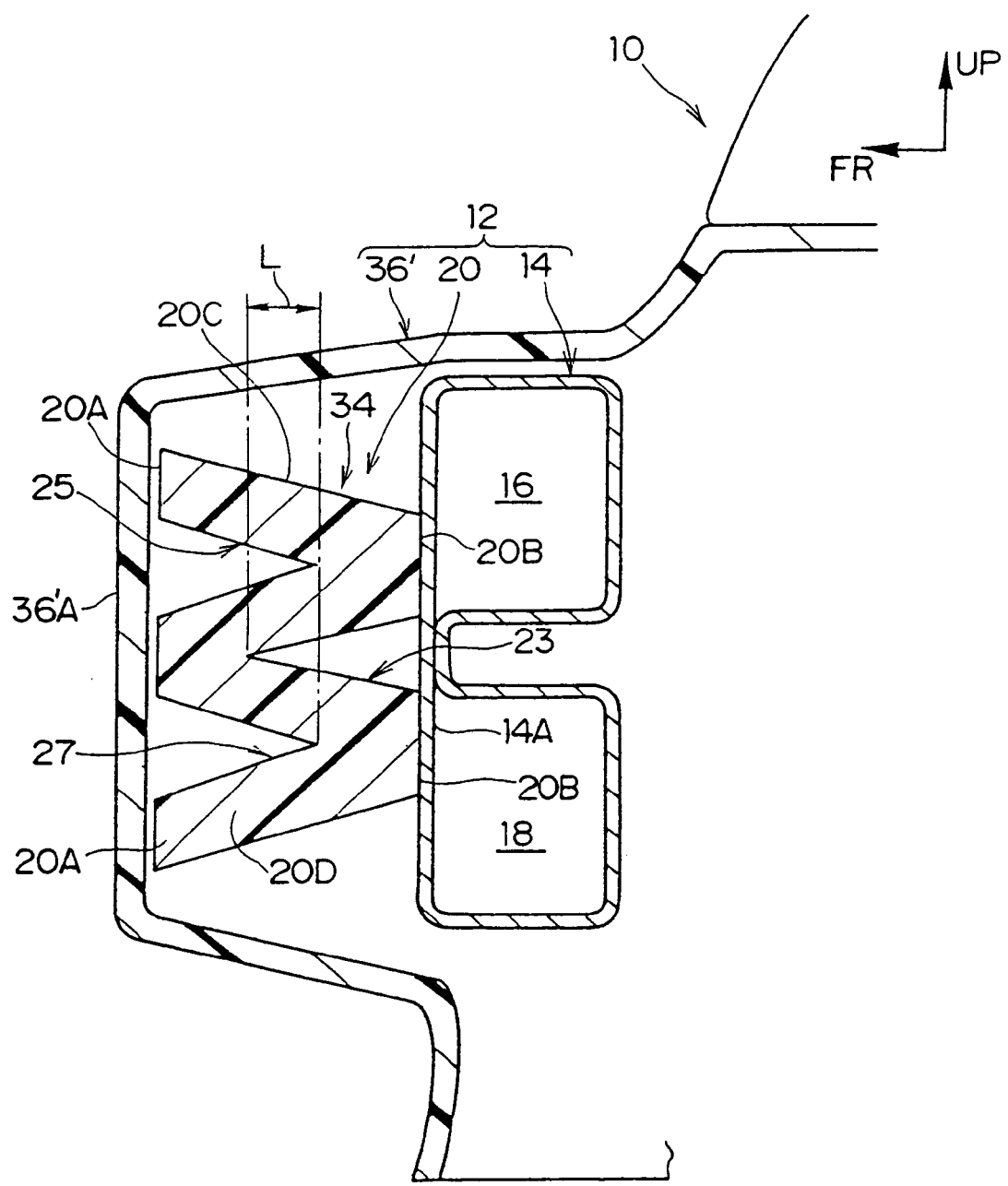
FIG. 23 is an enlarged cross-sectional view (taken along a line 4—4 in FIG. 24) of the bumper absorber for protecting pedestrians according to the eleventh embodiment of the present invention.

As shown in FIG. 23, on the other hand, in the inverted portions 34 of the bumper absorber 20 for protecting pedestrians 20, the cross-sectional configuration of one inverted portion 34, as taken along the vehicle transverse direction, is formed into a W shape having a portion in which a rear notch portion 23, which is notched from the vehicle rear side, and an upper front notch portion 25 and a lower front notch portion 27, which are notched from the vehicle front side, overlap with one another in the vehicle vertical direction, and the length of the portion at which the rear notch portion 23, and the upper front notch portion 25 and the lower front notch portion 27 overlap with one another is expressed by L.

Examples of materials used for the bumper absorber for protecting pedestrians 20 include the same materials as those described in the first embodiment of the present invention, and a description thereof will be omitted.

As shown in FIGS. 22 and 23, the bumper reinforcement 14 and the bumper absorber for protecting pedestrians 20 are covered with a bumper cover 36'. A front wall portion 36'A of the bumper cover 36 and a front wall portion 20A of the bumper absorber for protecting pedestrians 20 face each other. Further, a rear wall portion 20B of the bumper absorber for protecting pedestrians 20 abuts the front wall portion 14A of the bumper reinforcement 14. An upper wall portion 20C and a lower wall portion 20D of the bumper absorber for protecting pedestrians 20 are inclined portions that respectively correspond to an upper portion and a lower portion of the W shape.

Next, an operation of the present embodiment will be explained.

In the present embodiment, when a pedestrian is hit by the front bumper 12, a load is applied from the vehicle front via the front wall portion 36'A of the bumper cover 36' to the bumper absorber for protecting pedestrians 20. At this point, as shown in FIG. 20, at an initial stage when the load is applied to the bumper absorber for protecting pedestrians 20, a load F is generated at the inverted portion 34 of the bumper absorber for protecting pedestrians 20 in a direction in which the upper wall portion 20C and the lower wall portion 20D extend (in the direction of arrow A of FIG. 20). On the other hand, a load is generated at the ordinary portion 32 of the bumper absorber for protecting pedestrians 20 in a direction in which a distance between the upper wall portion 20C and the lower wall portion 20D becomes narrower (direction of arrow B in FIG. 20).

Figure 21:
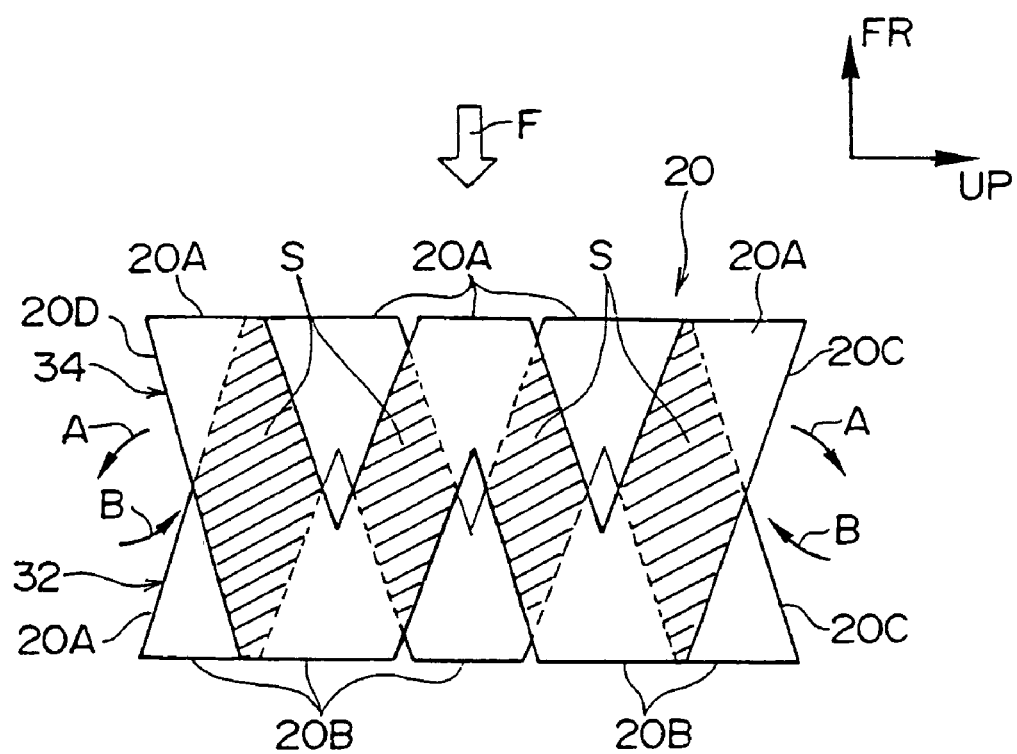
FIG. 21 is an enlarged cross-sectional view taken along a line 2—2 in FIG. 20.

As a result, as shown in FIG. 21, a shearing force is generated at a portion at which ordinary portions 32 and the inverted portion 34 of the bumper absorber for protecting pedestrians 20 intersect, namely, at a connecting portion S of a boundary portion between the adjacent inverted W shapes (a hatched portion shown in FIG. 21).

Figure 25:
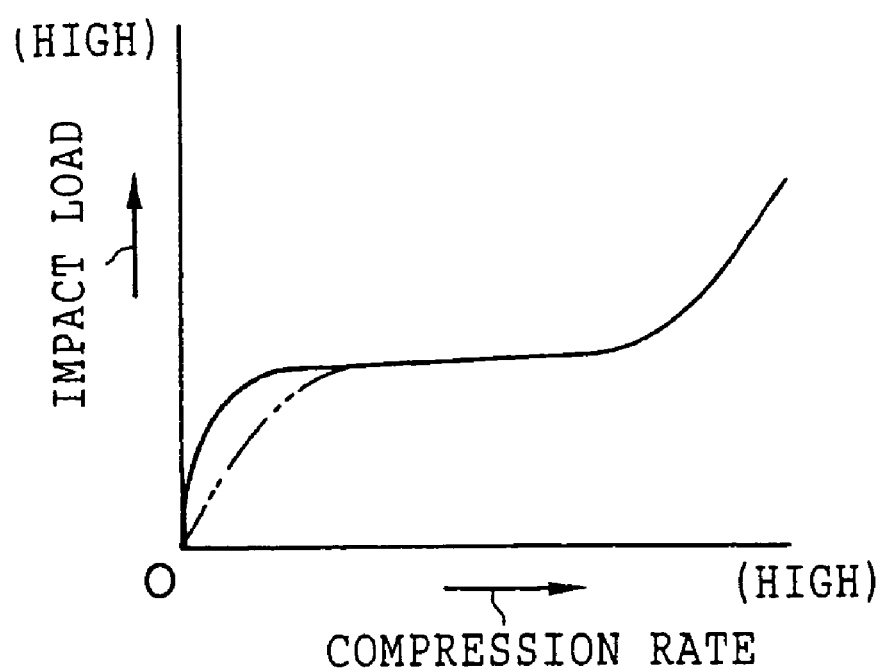
FIG. 25 is a graph of load characteristics of the bumper absorber for protecting pedestrians according to the eleventh embodiment of the present invention.

For this reason, in the present embodiment, as shown by solid line in FIG. 25, an initial rise in load level when an impact load is applied from the vehicle front to the bumper absorber for protecting pedestrians 20 can be increased, and a decrease in an energy absorbing amount can be prevented, as compared to a case which is shown by a double-dashed line in FIG. 25 in which the orientations of the W shapes are not inverted at predetermined intervals in the vehicle transverse direction, namely, in a case in which the bumper absorber for protecting pedestrians 20 entirely comprises the ordinary portion 32.

In the final stages of the deformation of the bumper absorber, the connecting portion S is broken by the shearing force, and the W shape extends, causing a remaining thickness of the bumper absorber which has been compressed to be reduced. Accordingly, the timing at which a bottoming load is generated can be delayed, and a rise in the impact load acting on a pedestrian who is hit by a bumper can be controlled.

[Twelfth Embodiment]

Figure 26:
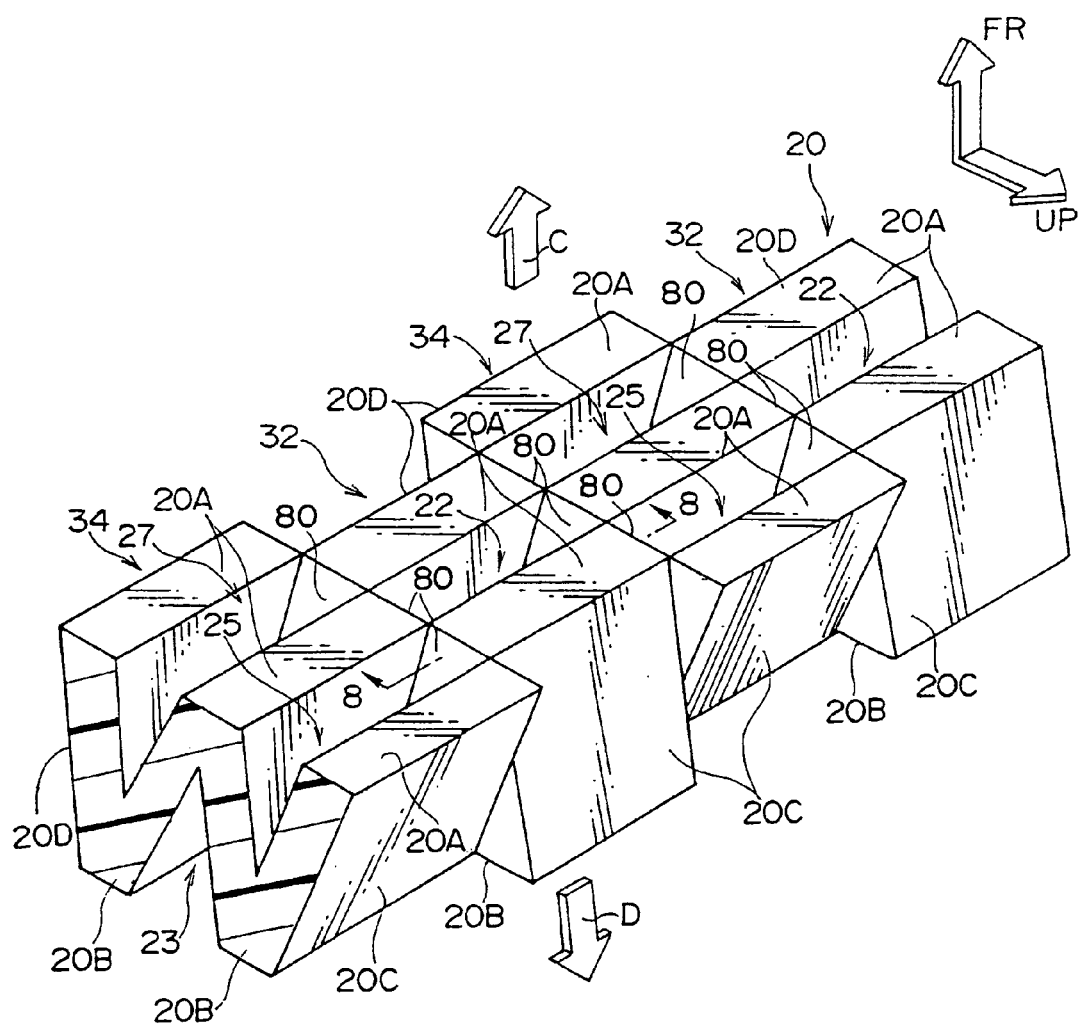
FIG. 26 is a perspective view of a bumper absorber for protecting pedestrians according to a twelfth embodiment of the present invention, as seen from a vehicle diagonal front.
Figure 27:
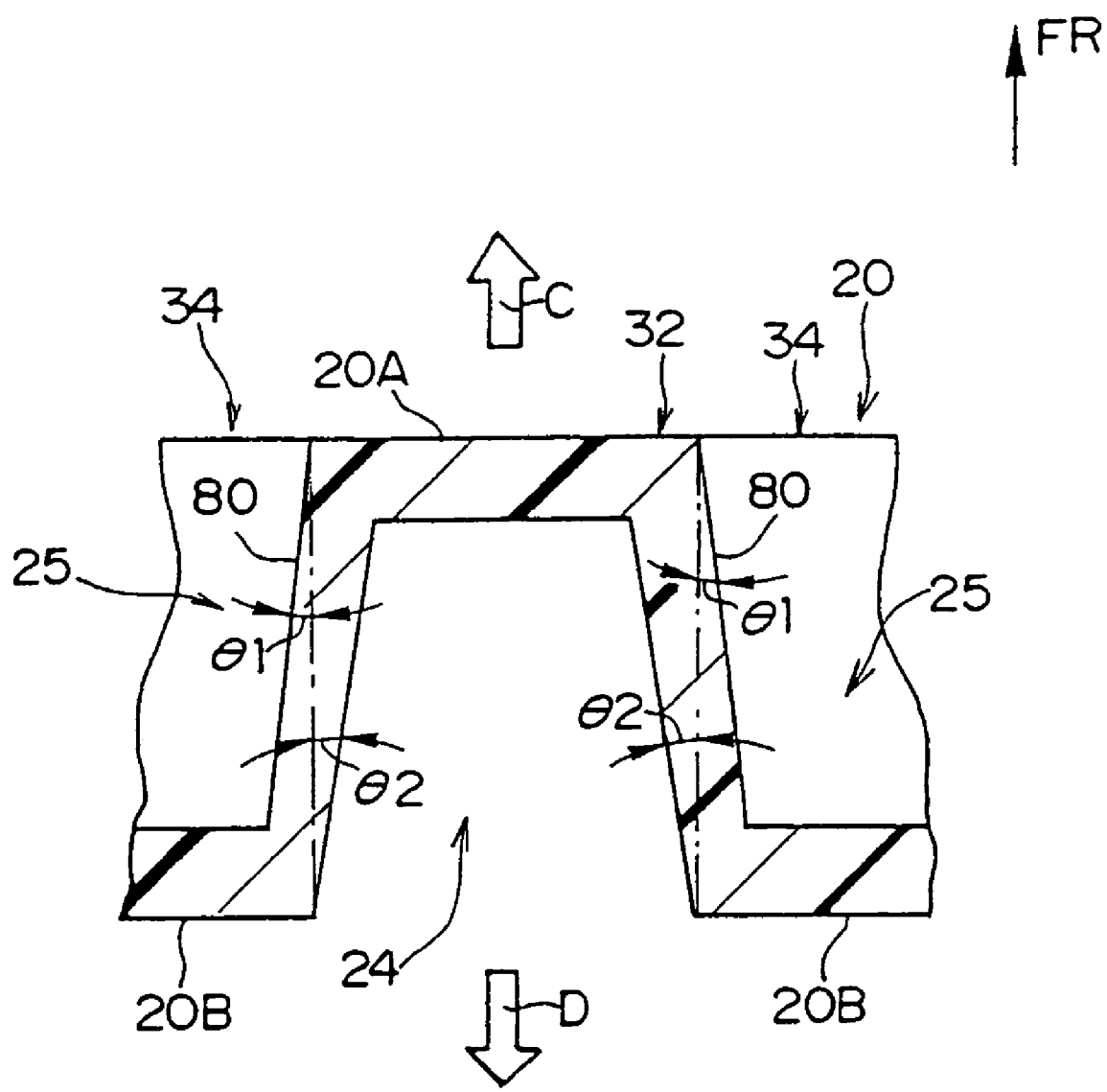
FIG. 27 is an enlarged cross-sectional view taken along a line 8—8 in FIG. 26.
Figure 28:
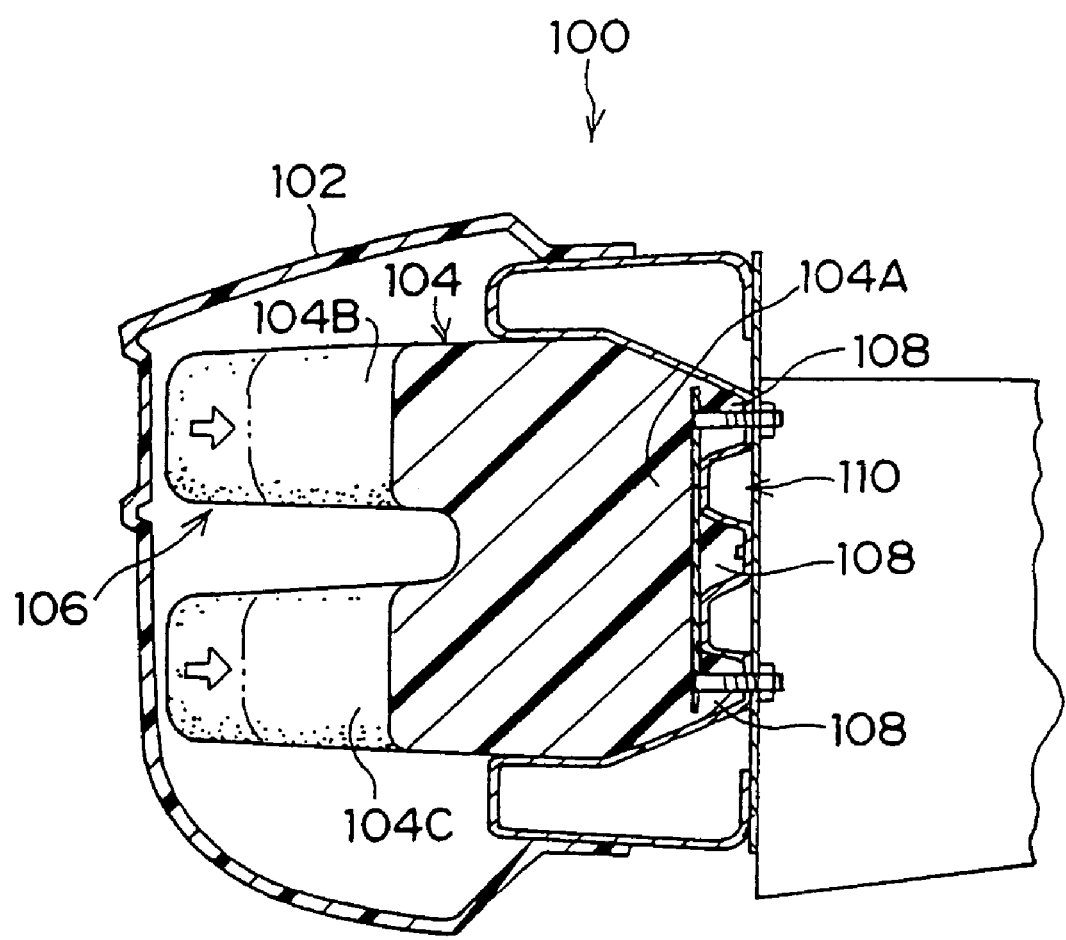
FIG. 28 is a schematic cross-sectional view of a conventional bumper absorber for protecting pedestrians.

With reference to FIGS. 26 and 27, a bumper absorber for protecting pedestrians 20 according to a twelfth embodiment of the present invention will be explained hereinafter.

Portions identical to those in the eleventh embodiment will be denoted by the same reference numerals and a description thereof will be omitted.

As shown in FIG. 26, in the present embodiment, a boundary wall portion 80 between the ordinary portion 32 and the inverted portion 34 of the bumper absorber for protecting pedestrians 20 are inclined in a direction in which the bumper absorber is removed from a mold (in directions of arrow C and arrow D in FIG. 26).

As shown in FIG. 27, the boundary wall portions 80 of the bumper absorber for protecting pedestrians 20 are inclined at an inclination angle θ1 with respect to the forward removal direction (direction of arrow C in FIG. 26) so as to prevent a hole from being formed in the vicinity of the boundary wall portion 80 when the bumper absorber is removed from a mold in a forward direction. Further, the boundary wall portion 80 is inclined at an inclination angle θ2 (θ1=θ2) with respect to the rearward direction (direction of arrow D in FIG. 26) so as to prevent a hole from being formed in the vicinity of the boundary wall portion 80 when the bumper absorber is pulled out in a rearward removal direction.

Accordingly, in the present embodiment, the bumper absorber can be manufactured with a simple molding structure in which ordinary upper and lower molds are used, without using a slide cam. Accordingly, the bumper absorber can be manufactured inexpensively.

In the eleventh and twelfth embodiments of the present invention described above, it is apparent for those skilled in the art that various other modifications can be enabled without departing from the spirit of the invention. For example, in the twelfth embodiment, the inclination angle θ1 and the inclination angle θ2 have been made the same (θ1=θ2). However, the inclination angle θ1 and the inclination angle θ2 can be made different from each other (θ1≠θ2).

Further, in the eleventh and twelfth embodiments of the present invention described above, the cross sectional configuration of the bumper absorber 20, as taken along the direction which is orthogonal to the longitudinal direction of the bumper absorber 20 (i.e., as seen from the vehicle transverse direction) is formed into a W shape. However, the cross sectional configuration of the bumper absorber 20, as taken along the direction which is orthogonal to the longitudinal direction of the bumper absorber (as seen from the vehicle transverse direction) is not limited to the W shape, and instead, can be formed into another zigzag shape including a V shape.

INDUSTRIAL APPLICABILITY

The bumper absorber for protecting pedestrians according to the present invention exhibits excellent effects in that a load level rises swiftly at an initial stage when a load is applied to a pedestrian hit by a bumper, while a rise in impact load acting on the pedestrian who is hit by the bumper can be controlled.

What is claimed is:

1. A bumper absorber for protecting pedestrians, which is disposed inside a bumper cover with a longitudinal direction of the bumper absorber for protecting pedestrians being disposed along a vehicle transverse direction and which is formed by a foam for absorbing impact energy, characterized in that said bumper absorber has a cross-sectional configuration, taken orthogonal to the longitudinal direction thereof, which cross-sectional configuration is formed into a shape having a portion in which a front notch portion notched from a vehicle front side and a rear notch portion notched from a vehicle rear side overlap with one another in a vehicle vertical direction, and the bumper absorber has opening means for opening, when a load having a predetermined value or higher is applied from the vehicle front to the bumper absorber, an upper wall portion in an upper direction and for opening a lower wall portion in a lower direction.

2. The bumper absorber according to claim 1, further comprising opening controlling means for controlling opening of the upper wall portion and the lower wall portion at an initial stage when a load is applied from the vehicle front to the bumper absorber.

3. The bumper absorber according to claim 2, wherein the opening controlling means are at least ribs that are provided at the notches at the vehicle rear side so as to be separated from each other at predetermined intervals in a longitudinal direction of the bumper absorber, such that the ribs are broken when the upper wall portion and the lower wall portion are bent and deformed to a predetermined amount.

4. The bumper absorber according to claim 2, wherein the opening controlling means is fixing means for fixing the upper wall portion and the lower wall portion to a bumper reinforcement, and fixing by the fixing means is released when the upper wall portion and the lower wall portion are bent and deformed to a predetermined amount.

5. The bumper absorber according to claim 1, further comprising a groove which is formed from a side opposite to the front notch portion.

6. The bumper absorber according to claim 1, wherein a cutting edge angle of the front notch portion and a cutting edge angle of the rear notch portion are each in a range of from 10° to 15°.

7. The bumper absorber according to claim 1, further comprising convex portions which are formed at an inside of each rear notch portion and which, when a load having a predetermined value or more is applied from the vehicle front to the bumper absorber, are pressed and broken by the bumper reinforcement.

8. The bumper absorber according to claim 3, wherein a width of each of the ribs is from 5 mm to 10 mm and an interval between the ribs is from 30 mm to 50 mm.

9. The bumper absorber according to claim 1, wherein the cross-sectional configuration is a zigzag shape.

10. The bumper absorber according to claim 9, wherein the cross-sectional configuration is a shape in which a W is continuous.

11. The bumper absorber according to claim 10, further comprising opening controlling means for controlling the opening of the upper wall portion and the lower wall portion at an initial stage when a load is applied from the vehicle front to the bumper absorber.

12. The bumper absorber according to claim 9, wherein the cross-sectional configuration is formed into a crank shape, and the opening means are inclining surfaces which are formed at the upper wall portion and the lower wall portion, respectively, to form both end portions of the crank shape.

13. The bumper absorber according to claim 1, wherein a plurality of convex portions is formed at the upper wall portion and the lower wall portion so as to be separated from each other at predetermined intervals in the vehicle transverse direction.

* * * * *